(12) United States Patent
Krasnyansky

(10) Patent No.: US 12,406,235 B2
(45) Date of Patent: Sep. 2, 2025

(54) CONTINGENT PAYMENTS FOR VIRTUAL CURRENCIES

(71) Applicant: Serge M Krasnyansky, Miami Beach, FL (US)

(72) Inventor: Serge M Krasnyansky, Miami Beach, FL (US)

( * ) Notice: Subject to any disclaimer, the term of this patent is extended or adjusted under 35 U.S.C. 154(b) by 165 days.

(21) Appl. No.: 18/325,030

(22) Filed: May 29, 2023

(65) Prior Publication Data

US 2023/0306387 A1    Sep. 28, 2023

Related U.S. Application Data

(63) Continuation of application No. 17/338,087, filed on Jun. 3, 2021, now Pat. No. 11,669,812.

(60) Provisional application No. 62/704,971, filed on Jun. 5, 2020.

(51) Int. Cl.
| | |
|---|---|
| *G06Q 20/06* | (2012.01) |
| *G06Q 20/10* | (2012.01) |
| *G06Q 20/36* | (2012.01) |
| *G06Q 20/38* | (2012.01) |

(52) U.S. Cl.
CPC ......... *G06Q 20/065* (2013.01); *G06Q 20/102* (2013.01); *G06Q 20/3674* (2013.01); *G06Q 20/3829* (2013.01); *G06Q 2220/00* (2013.01)

(58) Field of Classification Search
None
See application file for complete search history.

(56) References Cited

U.S. PATENT DOCUMENTS

| 2020/0005293 A1* | 1/2020 | Opeola | G06Q 20/065 |
| 2020/0177579 A1* | 6/2020 | Allen | H04L 9/3239 |
| 2021/0090166 A1* | 3/2021 | Bayne | G06Q 20/3825 |

OTHER PUBLICATIONS

Vitalik Buterin, "Bitcoin Multisig Wallet: The Future of Bitcoin", Mar. 13, 2014 (Year: 2014).*
Mariia Rousey, "Bitcoin Escrow Explanation", Dec. 27, 2017 (Year: 2019).*

* cited by examiner

*Primary Examiner* — Neha Patel
*Assistant Examiner* — Timothy Paul Sax
(74) *Attorney, Agent, or Firm* — Adam T Hipp

(57) ABSTRACT

Approaches are described for contingent transfers of value. A configuration record for an account associated with a virtual wallet is obtained. The configuration record is used to evaluate at least one virtual wallet of an owner account. Based on the configuration record, keys or other secret data and an authorization scheme can be determined and applied to virtual wallets that are part of a contingent contract. Thereafter, the virtual wallets can be utilized to exchange tangible and virtual digital currencies in various financial transactions, banking operations, and other asset exchanges and/or utilized for another purpose such as exchanging an irreversible transfer of value as in a virtual currency to a reversible transfer of value as in fiat currency or a financial instrument.

20 Claims, 13 Drawing Sheets

CONTINGENT PAYMENTS FOR VIRTUAL CURRENCIES

CROSS REFERENCE TO RELATED APPLICATIONS

This application is a continuation of U.S. patent application Ser. No. 17/338,087, entitled "CONTINGENT PAYMENTS FOR VIRTUAL CURRENCIES," filed Jun. 3, 2021, now U.S. Pat. No. 8,055,282, and claims priority to U.S. Provisional Application No. 62/704,971, filed Jun. 5, 2020, and entitled "CONTINGENT PAYMENTS FOR VIRTUAL CURRENCIES," which is hereby incorporated herein in its entirety for all purposes.

BACKGROUND

Money, which comprises currency in various alternate forms, has at least three intrinsic uses: (1) it is a means for exchanging discrete quanta of value; (2) it is a means for storing measurable quanta of value; and (3) it is a standard-based unit of account. A fiat currency typically represents money in a tangible form and it has four desirable traits: (i) divisibility; (ii) durability; (iii) fungibility; and (iv) verifiability. Recently, innovations have expanded the definition of money into the realm of digital assets, crypto-currencies, and other virtual currencies which represent store of value in discrete data structures handled by modified peer-to-peer networking algorithms and other computer-implemented regimes.

These virtual currencies (e.g., bitcoin, Litecoin, Ethereum, and other blockchain-based virtual currency) can be held in virtual wallets, and the wallets' balances and debiting and crediting transactions can be maintained in a global transaction ledger, such as the blockchain, where each type of virtual currency can have its own global transaction ledger. These virtual or cryptocurrencies are built upon public-key cryptography, a cryptographic system that uses pairs of keys: public keys, which are publicly known and essential for identification, and private keys, which are kept secret and are used for authentication and encryption. In the example of the blockchain, the global transaction ledger is secured by public key cryptography and a multitude of identical copies of it are distributed and maintained by a global peer-to-peer network. This peer-to-peer network is designed to ensure impossibility of theft of virtual funds and accuracy of transaction tracking. Blockchain also offers some degree of a wallet owner's anonymity, since all wallets are addressed by an opaque hash code that does not offer any identifiable information of the wallet's owner.

Conventional transactions of virtual currencies on a global transaction ledger are typically final and irreversible. That is, once funds are sent from one virtual wallet to another, they cannot be reclaimed back-except by contacting the owner of the receiving wallet and convincing him or her to send the funds back. The owner of the receiving wallet, however, may be unknown. Further, while payments (e.g., bank transfers, credit card and personal check payments) using real-world currencies (e.g., fiat currencies such as the US dollar) have some degree of reversibility, and often it is very easy to reverse a payment, the irreversibility of financial transactions on a global transaction ledger creates the challenge of exchanging real-world currencies for virtual currencies. Accordingly, there is a need in the art to resolve the issue of exchanging an irreversible (and therefore, certain) payment in a virtual currency to a reversible (carrying a degree of uncertainty) payment in fiat currency or a financial instrument whose value is denominated in fiat currency.

BRIEF DESCRIPTION OF THE DRAWINGS

Various embodiments in accordance with the present disclosure will be described with reference to the drawings, in which.

DETAILED DESCRIPTION

Figure 1:
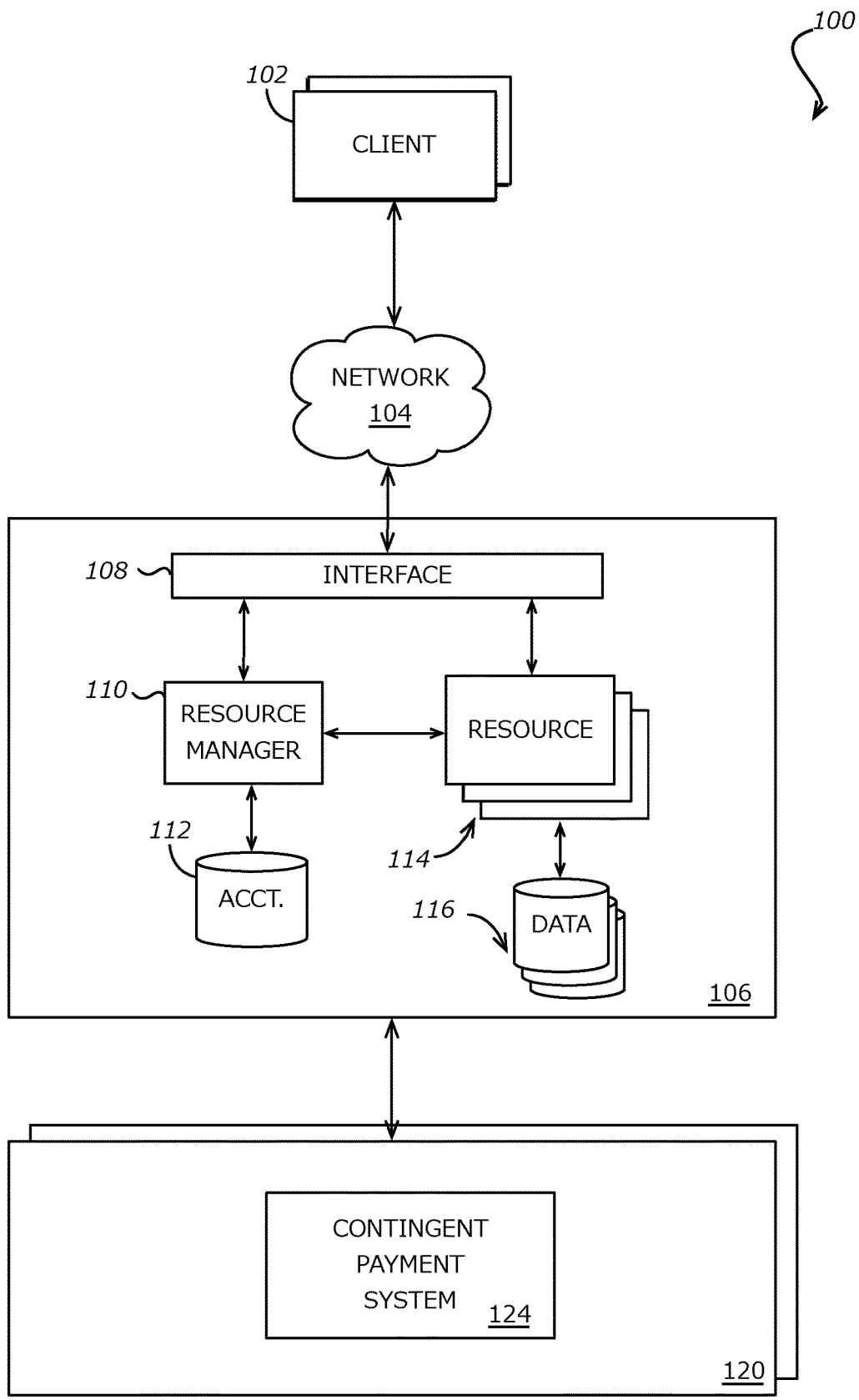
FIG. 1 illustrates an example environment in which aspects of the various embodiments can be implemented.

Systems and methods in accordance with the embodiments described herein overcome various deficiencies in existing approaches to managing financial risk in financial transactions and digital asset exchanges. In particular, various embodiments utilize a contingent transfer of value system that uses multi-signature wallets to allow for exchanging tangible and virtual digital currencies (e.g., a cryptocurrency) or other data representing financial value inhering in various types of assets, and data representing ownership of units of those assets (e.g., the private keys corresponding to units of a cryptocurrency) in various financial transactions, banking operations, and other exchanges of value on a network combining features of both decentralized and centrally-regulated cryptocurrency systems of member subscribers in communication with other commercial banking and finance networks and services, and in real-world settings where there is a transfer of value.

For example, a purchaser and a provider may desire to enter into a financial transaction or other transfer of value including a contingent transfer of value. For instance, the purchaser may want to buy an item from the provider. The purchaser and the provider in this example have multi-signature wallets. In an embodiment, a multi-signature wallet ("multisig") is a type of virtual currency wallet that is designed to have multiple (e.g., 2, 3, 5, etc.) private keys. In contrast, a regular (non-multisig) wallet has only one private key. The private key is used to sign transactions, providing a mathematical proof that the signed transactions come from the owner of the wallet. The signature also prevents the transaction from being altered by anybody once it has been issued. Additionally, multisig and non-multisig wallets have at least one public key, also known as the "wallet address." Addresses to which payments or other transfer of value can be sent are derived from public keys by application of a hash function and encoding scheme. The corresponding private keys act as a safeguard and a valid payment message from an address must contain the associated public key and be digitally signed by the associated private key. Because anyone with a private key can spend all of the bitcoins associated with the corresponding address, the essence of virtual currency security is protection of private keys. It should be noted that embodiments described herein can be used where there is a transfer (or exchange) of value, including, for example, a fiat value exchange for cryptocurrency value, a cryptocurrency value exchange for a fiat value, a cryptocurrency value exchange for an item or service (e.g., a car, an ice cream cone, personal training session, house painting, etc.) It should be further noted that although payments and types of payments are described herein, embodiments described can be used with any one of a number of transfers of value, including at least those described above.

The owner of the wallet can freely share the address to anyone who wishes to send funds to that wallet. Each such configuration can have several possible types of authorization requiring a subset of the keys to be used in order to unlock the wallet and spend its funds. For example, a wallet with 2 keys may have a type of authorization "1-of-2", which means that any one of two keys is enough to unlock the wallet. A wallet with 2 keys may also have a 2-of-2 authorization requiring both keys to be present in order to gain access to the funds in the wallet.

The multi-signature wallets of the purchaser and provider can be configured with keys and a particular authorization scheme. For example, the multi-signature wallets can be configured with three keys and a 2-of-3 authorization scheme. It should be noted that other key and authorization schemes can be considered in accordance with embodiments described herein. In this scheme, any two out of three keys can unlock the wallet. Based on a configuration record or other configuration data configured to facilitate virtual transactions, ownership of two keys can be assigned to an "admin" role, and one key to a wallet "owner" role. The admin can access the wallet using his two keys, but the owner can access it only by asking the admin to "co-sign" with one of his keys. Thereafter, the virtual wallets can be utilized to exchange tangible and virtual digital currencies in various financial transactions, banking operations, and other asset exchanges and/or utilized for another purpose such as exchanging an irreversible transfer of value such as a payment in a virtual currency to a reversible transfer of value such as a payment in fiat currency or a financial instrument.

Advantageously, contingent payment systems (also referred to as contingent transfer of value systems) described herein may optimize asset exchanges over conventional financial and other ecosystems. In an example, the contingent payment system can be utilized for insurance policies (or other financial instruments with similar upfront premium payment and payoff conditions, such as, for example, call or put options). In a conventional insurance policy, there may be a source of confusion as to whether the adverse event (such as a car accident) will trigger the payment by insurance policy, instead of triggering the non-payment or default. The contingent payment system described herein can remove or at least reduce an amount of confusion when focusing on the time after the adverse event has already occurred (the event that was the subject of insurance policy is now with 100% certainty) and now the insurance company must pay up on the claim. If the insurance company fails to pay the claim (e.g., due to company's insolvency), such non-payment is the contingency event within the contingent payment framework described herein. The advantages are apparent when insurance premiums are paid in virtual currency (while claim payments are made by fiat). In this case, the insured person would be the admin in the contingent payment framework, sending his policy premium payments to the insurance company on the blockchain. The insurance company has the role of an owner (e.g., owner1 described below). Failure to pay on a legitimate claim (e.g., occurrence of the contingency event of non-payment) by the insurance company should result in Admin retrieving back all of his premium payments. In another example, utilizing a contingent payment system may allow for financial transactions deemed too risky. Additional financial transactions may then be possible utilizing at least some of the legacy financial systems, allowing for optimal use of memory and processing power over a system that does utilize a contingent payment system. It should be noted that payments include payments to accounts such as financial accounts (e.g., checking, saving, credit card accounts), payments to cryptocurrency accounts, payments to user accounts or other identifiers of accounts, payments to digital wallets (or virtual wallet) or other software-based systems that securely stores users' payment information and/or passwords including, for example, a collection of private keys and allows for fiat and cryptocurrency exchanges, among other such payment types including fiat payments, cryptocurrency payments, digital payments, etc.

Various other functions and advantages are described and suggested below as may be provided in accordance with the various embodiments.

FIG. 1 illustrates an example environment 100 in which aspects of the various embodiments can be implemented. In this example, a user can utilize a client device 102 to communicate across at least one network 104 with a resource provider environment 106. The client device 102 can include any appropriate electronic device operable to send and receive requests or other such information over an appropriate network and convey information back to a user of the device. Examples of such client devices 102 include personal computers, tablet computers, smartphones, notebook computers, and the like. The user can include a person authorized to manage the aspects of the resource provider environment.

The network(s) 104 can include any appropriate network, including an intranet, the Internet, a cellular network, a local area network (LAN), a network combining features of both decentralized and centrally-regulated cryptocurrency systems of member subscribers in communication with other commercial banking and finance networks and services or any other such network or combination, and communication over the network can be enabled via wired and/or wireless connections.

The resource provider environment 106 can provide a contingent payment system (also referred to as a contingent transfer of value system) for exchanging tangible and virtual digital currencies (e.g., a cryptocurrency) or other exchanges of value in various financial transactions, banking operations, and other asset exchanges on a network. This can include, for example, allowing for the exchange of irreversible transfers of value such as payments in a virtual currency to a reversible transfer of value such as a payment in fiat currency or a financial instrument whose value is denominated in fiat currency. As described, cryptocurrencies are built upon public-key cryptography, a cryptographic system that uses pairs of keys: public keys, which are publicly known and essential for identification, and private keys, which are kept secret and are used for authentication and encryption. Major cryptocurrencies like Bitcoin, Ethereum, and Bitcoin Cash function using information corresponding to an address, the address being associated with a balance and used for sending and receiving funds, and the address' corresponding public and private keys. The generation of a virtual currency address begins with the generation of a private key. From there, its corresponding public key can be derived using a known algorithm. The address, which can then be used in transactions, is a shorter, representative form of the public key.

The private key grants a cryptocurrency user ownership of the funds on a given address. A virtual wallet such as a cryptocurrency wallet automatically generates and stores private keys. These wallets store private and public keys and interact with various blockchains to enable users to send and receive digital currency and monitor their balance, and can include software-, hardware-, and paper-based wallets. Software wallets can be held on a desktop, mobile or online. Desktop wallets are downloaded and installed (e.g., on a PC or laptop) and are typically only accessible from a single computer in which they are downloaded. Online wallets run on the cloud and are accessible from any computing device in any location. Mobile wallets run on a mobile application, such as on a smartphone, tablet, or other portable computing device. Hardware wallets store a user's private keys on a hardware device, such as a USB drive. Although hardware wallets make transactions online, they are stored offline which delivers increased security. Hardware wallets can be compatible with several web interfaces and can support different currencies. Paper wallets can refer to a physical copy (e.g., printout) of the public and private keys associated with the wallet. Paper wallets can also refer to a piece of software that is used to securely generate a pair of keys which are then printed. When sending from a software-based wallet, the software signs the transaction with a private key, indicating to the blockchain network that the wallet holder has the authority to transfer the funds on the wallet's address.

The contingent payment system can include or be in communication with one or more other components/services, including, for example, a verification component/service, a notification component/service, a monitoring component/service, among other such components. In accordance with various embodiments, reversible payments or "contingent" payments is a payment (or transfer of value) that is reversible and that the event when the reversal occurs is a "contingency event" that may or may not occur. For example, the value of a credit card payment is contingent upon the credit card account holder never initiating a chargeback. In another example, the value of a loan or bond (as a financial instrument having a valuation and a value) repayment is contingent on a loan default or a bond issuer's bankruptcy, and the value of a forward contract is contingent on the hedger's failure to deliver. Contingency of payment (or contingency of value of a financial instrument) or contingent transfers of value implies uncertainty of whether the payment reversal event will occur. Many contingent payments and financial instruments have a time limit—and therefore an "expiration date of contingency"—after which the payment becomes certain, final and irreversible.

The resource provider environment 106 can include any appropriate components for receiving requests and returning information or performing actions in response to those requests. As an example, resource provider environment 106 might include Web servers and/or application servers for receiving and processing requests to allow for contingent or reversible payments. For example, the servers can communicate with multisig wallets configured with a 2-of-3 authorization scheme and the roles of Admin (e.g., having two of the three keys) and Owner (e.g., having one of the three keys), which can be utilized to de-risk contingent payments (or other contingent transfers of value) in such a way that they can now be accepted in exchange for virtual currencies without fear of monetary loss due to a contingency event. As described, a private key in the context of a virtual currency is a secret number that allows the virtual currency to be spent. Individual virtual currency addresses have a matching private key, which is saved in the virtual wallet file of the person who owns the balance. The private key is mathematically related to the virtual currency address, and is designed so that the virtual currency address can be calculated from the private key. The addresses to which payments can be sent are derived from public keys.

While this example is discussed with respect to the internet, web services, and internet-based technology, it should be understood that aspects of the various embodiments can be used with any appropriate services available or offered over a network in an electronic environment. As described, multisig wallets are otherwise normal (e.g., non-multisig virtual) wallets that can send and receive funds from and to the blockchain. A blockchain record of payment sent from a multisig wallet will not differ from that sent by a regular single-key wallet, and there are no other differences between in payments through multisig wallets and payments through a regular wallet. Likewise, a payment sent from one multisig wallet to another multisig wallet is also recorded as a normal blockchain transaction, with the blockchain excluding any information relating to the fact that the two wallets were multisig wallets. In various embodiments, transactions involving contingent payments are between multisig wallets. Furthermore, when a payment is sent between two wallets (possibly having two different Owners), both the wallets have the same Admin.

In various embodiments, resource provider environment 106 may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. Methods for enabling a user to reserve various resources and resource instances are well known in the art, such that a detailed description of the entire process, and explanation of all possible components, will not be discussed in detail herein. In this example, resource provider environment 106 includes a plurality of resources 114 of one or more types. These types can include, for example, application servers operable to process instructions provided by a user or database servers operable to process data stored in one or more data stores 116 in response to a user request.

In various embodiments, resource provider environment 106 may be in communication with various types of resources that can be utilized for providing contingent or reversible payments or other contingent transfers of value. As described, virtual currencies (e.g., Bitcoin, Litecoin, Ethereum, etc.) can be held in virtual wallets, and the wallets' balances and debiting and crediting transactions can be maintained in a global transaction ledger, such as the blockchain. Each type of virtual currency can have its own blockchain.

The blockchain received its name from the fact that, as a global ledger, it links all transaction records to one another in a chain-like structure: each new record (or "block") contains and encrypts hash (digital signature) of the previous block. This means that any alteration of data in any of the preceding blocks will lead to invalidating the current block. This ensures existence of only one valid transaction ledger. Additionally, in order to secure the most recent transaction in the chain, it has to be linked to at least three more subsequent transactions, at which point it is considered fully confirmed (as it becomes cryptographically signed at least three times).

Cryptography is the application of mathematics and computer science to develop and implement objects and proofs providing security to data and software. This is essential for online/digital commerce and banking. In the case of Bitcoin, SHA-256 is a method of encryption utilized in cryptography which is used, among others, to make it impossible for anybody to spend funds from another user's wallet or to corrupt the block chain. It can also be used to encrypt a wallet, so that it cannot be used without a password.

A wallet is a digital analogy to the physical object for storing money and information. In a digital currency network, a wallet may contain a user's private key(s) which allows access to currency allocated to the wallet in the block chain. For example, a Bitcoin wallet can display the total balance of bitcoins it controls and lets a user pay a specific amount to a specific person. This differs from credit card use where a cardholder is charged by the merchant. Resources may be utilized to manage those wallets.

One of the key properties of all virtual currencies is the finite number of currency units that can exist. This property—the limited supply—is one reason that virtual currencies have a market value and are in demand. Creation of each new unit of a virtual currency (e.g., each 1 bitcoin) is known as "mining." Mining is a process, often performed by third parties, of executing computer instructions to confirm transactions and thereby increase security. Mining involves making computer hardware do mathematical calculations as if on behalf of the network (or the authority operating the network, such as a digital currency provider like Bitcoin). As a reward for their services, Bitcoin miners can collect transaction fees for the transactions they confirm, along with newly created bitcoins. Mining is a specialized and competitive market where the rewards are divided up according to how much calculation is done. Mining requires an ever-increasing amount of compute power to find a new unique hash code for a new unit. Because of this ever-increasing computational difficulty, there is a finite number of units of each virtual currency that can be created ("mined out").

As described, conventional virtual currencies and their transactions on the blockchain are typically final and irreversible. That is, once funds are sent from one virtual wallet to another, they cannot be reclaimed back-except by contacting the owner of the receiving wallet and convincing him or her to send the funds back. The owner of the receiving wallet, however, may be unknown. The irreversibility of blockchain transactions creates a challenge for exchanging real-world currencies (e.g., fiat currencies, such as the US dollar) for virtual currencies. The problem is that many types of fiat payments (e.g., bank transfers, credit card and personal check payments, electronic payment sent between fiat accounts at financial institutions, etc.) have some degree of reversibility, and often it is very easy to reverse a payment.

In the United States, payment reversibility is governed by various laws providing for the ability of a payer to file a claim with the payment processing company for return of funds. Reasons for such claims may be, for example, bad quality of product or service received, or the product was never delivered. Other legitimate reasons may be the suspicion of fraud where the payer claims that his or her account was compromised and used by somebody else to make an unauthorized payment.

Certain payments may be difficult and, in some embodiments, may not be reversed according to the current jurisdictional laws, including, for example, cash deposit to a payee's bank account and wire transfer (e.g., using the real-time settlement Fedwire or CHIPS network). In an embodiment, an "irreversible payment" is one where the payment received by the payee can cannot be undone and/or the likelihood for the payee to lose or fail to receive all or part of the payment is substantially zero.

In accordance with various embodiments, reversible payments can have a time limit within which they can be reversed by the payer filing a claim. Once the time limit elapses, the payment becomes irreversible. The reversals are also known as "chargebacks." For example, ACH debits made from a corporation to a consumer bank account can be reversed within the following 90 days, ACH debits between two corporate bank accounts can be reversed within 5 business days, credit card payments can be reversed within 180 days, and so forth. With personal checks (or corporate check-any non-cashier check) money order payment, etc., chargebacks can be initiated by the bank when the deposited item is returned due to insufficient funds, a closed account, or being discovered to be counterfeit, stolen, altered, or forged.

Additionally, reversible payments can include various other financial instruments and standard types of contracts that promise to pay the bearer a sum of money at a future time. In an example, the US dollar note (also referred to as the greenback) can be considered a promise to pay (e.g., a promise made by the US Treasury to pay "in lawful money," which can mean in gold) to the bearer of the cash note. Other examples include IOU's, promissory notes, and the like. These types of payment require the payee to part with real fiat funds in exchange for a document that promises repayment of said funds at a later time and bear significant risks of never actually receiving the repayment. In yet another example, personal and corporate loans, lines of credit, and bonds can experience default. In another example, derivative contracts traded on Wall Street (at exchanges or "over-the-counter" (OTC)) such as commodity futures, forwards, options or warrants, etc., can experience failure to deliver. These types of contracts obligate the issuer to deliver certain commodity or stock on the date of expiration. As such, the bearer of the contract receives a payment of said commodity of stock, rather than a money sum.

In some embodiments, the payee in a financial contract receives a fiat payment unless an event occurs (e.g., no chargeback against payee if the contingency event lapses). In contrast, another class of financial instruments that may benefit in accordance with the embodiments described herein include situations where the payee receives the fiat payment when the adverse event does occur (e.g., no chargeback against payee if the contingency event occurs), such as with various insurance policies. An insurance policy is a contract between a payor and a payee, where the payee will receive a fiat payment only if an adverse event occurs. It should be noted that other reversible payments can be utilized in accordance with the embodiments described herein, including, for example, any payment where there is a chance for the payee (the recipient) to not receive all or part of it, or to lose all or part of it after receiving it. It should be further noted that although payments and types of payments are described herein, embodiments described can be used with any one of a number of transfers of value, including at least those described above or transfers of value otherwise tagged or labeled as such or transfers of value that can otherwise be determined based on the transfer and circumstances surrounding the transfer.

In this example, resource provider environment 106 includes contingent payment system 124 (also referred to as a contingent transfer of value system). The contingent payment system can be in communication with, for example, a verification component/service, a notification component/service, a monitoring component/service, among other such components. The systems and components may be hosted on multiple server computers and/or distributed across multiple systems. Additionally, the systems and components may be implemented using any number of different computers and/or systems. Thus, the systems may be separated into multiple services and/or over multiple different systems to perform the functionality described herein.

Contingent payment system 124 is operable to manage contingent (e.g., reversible) payments involving virtual currency. Contingent payment system 124 determines whether there is compliance with a contingency (also referred to as a contingency circumstance or contingency requirement) in a contingency contract and manages distribution of private keys for access to virtual funds associated with the contingency contract. A contingency requirement can include, for example, a non-occurrence of a contingent event, such as a reversal of a fiat transaction (e.g., check payment, credit card payment, or other payment set between fiat accounts at financial institutions. In other words, a contingency requirement can include a successful financial transaction, including an exchange of payments. This can include, for example, a transaction where fiat payments clear or a transaction where a chargeback process or other similar process is not initiated. A contingency contract includes a virtual currency transaction, a contingency (e.g., whether a contingency event should occur), and a contingency period (e.g., expiration date and/or time). In an example, a first user and a second user can enter into a contingency contract, in which the first user pays virtual currency to the second user in exchange for the second user making a contingent fiat payment (e.g., a personal check with possibility of bouncing due to lack of funds) to the first user. The virtual payment is contingent upon the contingent fiat payment (e.g., if the second user's personal check bounces within an expiration date, then the first user's virtual payment is reversed).

A contingency is a future event or circumstance (also referred to as a contingency event) which is possible but cannot be predicted with certainty, but realization of the contingency event or circumstance determines the finality of a payment. Thus, compliance with the contingency means the future circumstance was realized (e.g., a future event occurred, or an adverse future event lapsed) by the expiration date (as governed by the contingency contract) such that the virtual currency payment is finalized and keys (e.g., private keys to virtual wallets holding the virtual currency) are released accordingly to allow access to the virtual currency, or access to the virtual currency is otherwise granted. For example, a contingency event can be a bounced personal check before the expiration date (e.g., within 15 days, 30 days, etc., of a transaction). There would be compliance with the contingency if the contingency event lapses (e.g., the personal check does not bounce) by the expiration date, therefore allowing the virtual payment to finalize (e.g., the virtual payment payee is allowed to access the virtual funds). Noncompliance with the contingency would result in the reversal of the virtual payment (e.g., the contingency event of the check bouncing occurs by the expiration date). In another example, in purchasing goods with virtual currency, delivery of the goods is a contingency event. There would be compliance with the contingency if the contingency event occurs (e.g., the goods are delivered) by the expiration date, therefore allowing the virtual payment to finalize (e.g., the virtual payment payee is allowed to access the virtual funds). Noncompliance with the contingency results in the reversal of the virtual payment (e.g., the contingency event of the goods delivery lapses—i.e., the goods were not delivered—by the expiration date).

The contingent payment system 124 generates a virtual wallet associated with each user's account for the virtual currency transaction and configures the wallets according to an authorization scheme. In the example, the first user's wallet is a single key wallet (the single key allocated to the first user), allowing the first user to freely transfer his virtual coins to the second user's wallet. However, as the second user's wallet is the recipient of a balance of the original virtual funds, the second user's wallet is configured as a 2-of-3 multisig wallet, allocating a controlling number of keys (e.g., 2 keys) to the first user (e.g., holder of the original virtual funds) and a minority number of keys (e.g., 1 key) to the second user. Thus, to access the virtual funds in the second wallet, the second user (who only has one key) requires a co-signature from the first user (e.g., release one key from first user to the second user). This additional key required by second user will be released to the second user when the virtual payment is finalized (e.g., there is compliance with the contingency, for example, the personal check did not bounce, the goods were delivered, etc., by the expiration date). If the virtual payment is reversed (e.g., because there is noncompliance with the contingency, for example, the personal check bounced within 15 days of the transaction, the goods were not delivered, etc.), then the additional key is never released to the second user, and the first user (who still holds the controlling number of keys to the second wallet) accesses the second wallet and retrieves the virtual funds (therefore refunding himself of his virtual payment).

In various embodiments, the resources 114 can take the form of servers (e.g., application servers or data servers) and/or components installed in those servers and/or various other computing assets. In some embodiments, at least a portion of the resources can be "virtual" resources supported by these and/or components. While various examples are presented with respect to shared and/or dedicated access to disk, data storage, hosts, and peripheral devices, it should be understood that any appropriate resource can be used within the scope of the various embodiments for any appropriate purpose, and any appropriate parameter of a resource can be monitored and used in configuration deployments.

In at least some embodiments, an application executing on the client device 102 that needs to access resources of the provider environment 106, for example, to manage contingent payment system, implemented as one or more services to which the application has subscribed, can submit a request that is received to interface layer 108 of the provider environment 106. The interface layer 108 can include application programming interfaces (APIs) or other exposed interfaces, enabling a user to submit requests, such as Web service requests, to the provider environment 106. Interface layer 108, in this example, can also include a scalable set of customer-facing servers that can provide the various APIs and return the appropriate responses based on the API specifications. Interface layer 108 also can include at least one API service layer that, in one embodiment, consists of stateless, replicated servers that process the externally-facing customer APIs. The interface layer can be responsible for Web service front-end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component or the only component that is visible to and accessible by customers of the control service. The servers of the Web services layer can be stateless and scaled horizontally, as known in the art. API servers, as well as the persistent data store, can be spread across multiple data centers in a region, for example, such that the servers are resilient to single data center failures.

When a request to access a resource is received at the interface layer 108 in some embodiments, information for the request can be directed to resource manager 110 or other such systems, service, or component configured to manage user accounts and information, resource provisioning and usage, and other such aspects. Resource manager 110 can perform tasks such as to communicate the request to a management component or other control component which can manage distribution of configuration information, configuration information updates, or other information for host machines, servers, or other such computing devices or assets in a network environment, authenticate an identity of the user submitting the request, as well as to determine whether that user has an existing account with the resource provider, where the account data may be stored in at least one data store 112 in the resource provider environment 106. The resource manager can, in some embodiments, authenticate the user in accordance with embodiments described herein based on voice data provided by the user.

A host machine 120 in at least one embodiment can host the contingent payment system 124. It should be noted that although host machine 120 is shown outside the provider environment, in accordance with various embodiments, contingent payment system 124 can be included in provider environment 106, while in other embodiments, one or the other can be included in the provider environment. In various embodiments, one or more host machines can be instantiated to host such systems for third-parties, additional processing of preview requests, and the like.

Figure 2:
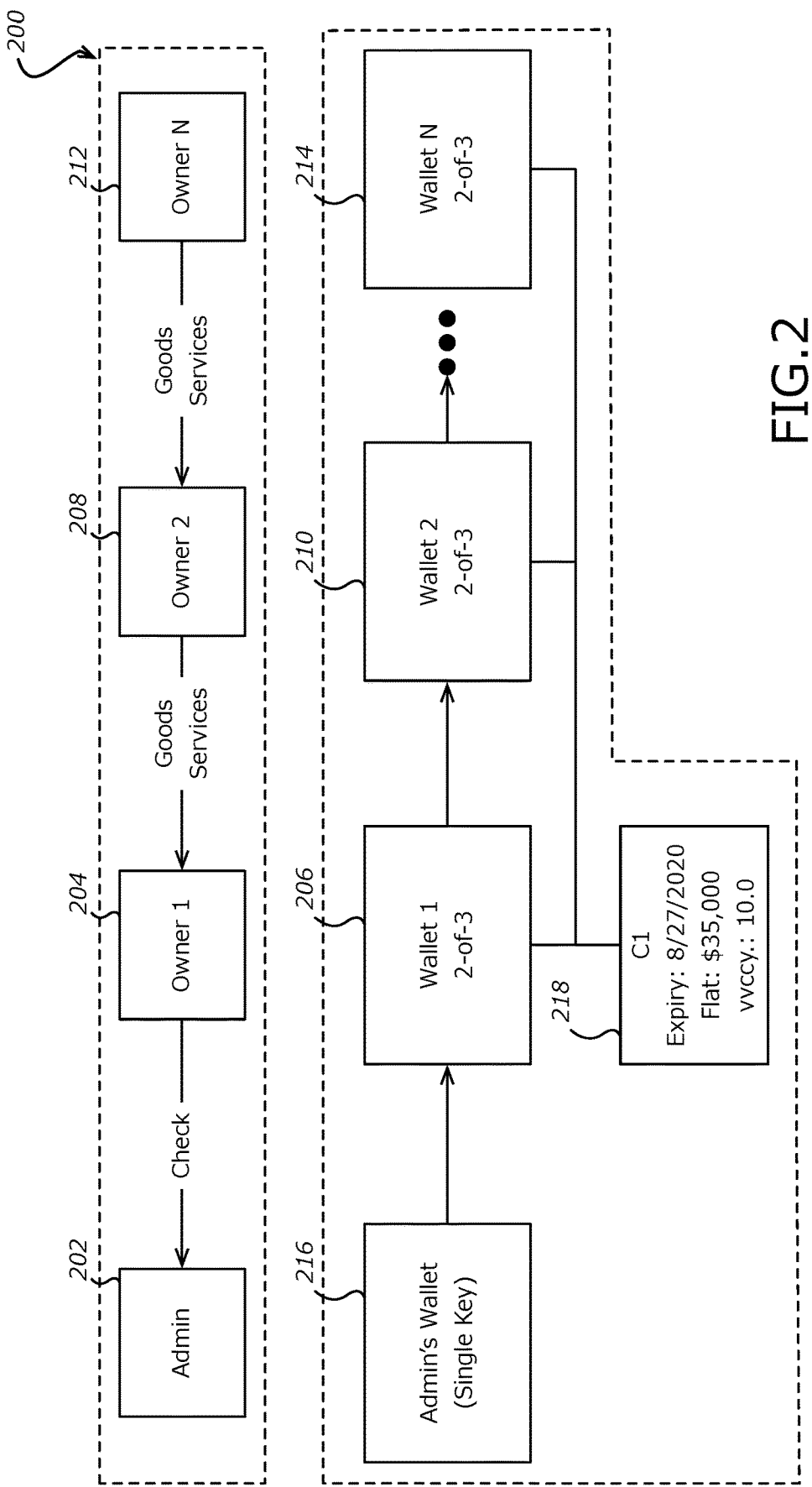
FIG. 2 illustrates an example contingent transfer of value in accordance with various embodiments.

FIG. 2 illustrates example 200 of a contingent transfer of value in accordance with various embodiments. It should be understood that reference numbers are carried over between figures for similar components for purposes of simplicity of explanation, but such usage should not be construed as a limitation on the various embodiments unless otherwise stated. In this example, admin 202 and owner 1 204 can engage in a contingent fiat transaction, where admin 202 can represent a person sending virtual currency in exchange for a contingent fiat payment. The counterparty to the transaction is owner 1 204. Owner 1 204 can be associated with multisig 2-of-3 wallet 1 206, of which admin 202 will be the majority key holder (e.g., keeping two keys) and owner 1 204 will be the minority key holder (e.g., hold the remaining one key). It should be noted that there is no limit on how many wallets or wallet owners the system can maintain, or how many payments the owners can send to each other. For example, there can be millions of wallets, owners and payments. Also, in an embodiment, there can be more than one majority key holder. For example, a wallet can be configured with a 3-of-7 authorization scheme, where a first user holds a controlling number of keys (e.g., 3), a second user also holds a controlling number of keys (e.g., 3), and the third user is the minority key holder (e.g., holding 1 key).

In a contingency contract 218, owner 1 204 receives virtual currency from admin 202 (e.g., from admin's wallet 216), in exchange for admin 202 receiving a fiat currency payment from owner 1 204. For example, suppose admin 202 pays 10 Bitcoins to owner 204, in exchange for owner 1 204 drawing a personal check for $35,000 against owner 1's 204 bank account and written in the name of admin 202. A hold may be placed on the check. For example, the bank where admin 202 deposits the check may place a hold of 15 days on the check. After 15 days, if the check has not bounced, the payment can become final. So, a contingency expiration date 15 days is assigned from the date of the transaction.

In accordance with an embodiment, owner 1 204 can choose to keep all 10 bitcoins in his multisig wallet as a long-term investment and never send any of the coins to anyone else. In this case, there are at least two possible outcomes. In one outcome, 15 days pass, and the bank successfully receives funds from the check and declares the payment finalized. A contingency event (e.g., the check bouncing) has lapsed after the contingency expiration date (e.g., 15 days). Admin 202 receives payment that has since become finalized, and one of the admin's 202 two keys is released to owner 1 204, thereby designating owner 1 204 as the majority key holder and allowing owner 1 204 to freely transfer all of the coins to another (non-multisig) wallet that is fully controlled only by owner 204.

In another outcome, the check is bounced because, for example, there were no funds on the account of owner 204 or the account was already closed. The bank initiates a chargeback and withdraws the previously deposited amount of the check from admin's 202 account. In this outcome, the contingency event (e.g., the check bouncing) has occurred within the contingency expiration period (e.g., 15 days). Because the check has bounced, a chargeback (e.g., reversal of the $35,000 payment) occurs. Thus, although admin 202 has parted with 10 bitcoins, he also never receives the $35,000 payment. Because the wallet 206 of owner 204 is a multisig wallet of which admin 202 has the controlling set of two keys, admin 202 can withdraw all 10 bitcoins from owner's 204 wallet 206 without requiring owner's 204 permission. Admin 202 has thus performed a "virtual currency chargeback" in response to a contingency event (e.g., the fiat currency chargeback of owner's 204 bounced check).

In accordance with various embodiments, owner 1 204 may desire to spend some of the virtual currency balance in wallet 206 (e.g., the 10 bitcoins currently in wallet 206). For example, owner 1 204 may send 3 coins to owner 2 208 in payment for services. In the example, owner 2 208 is associated with a multisig wallet 2 210, obtained from admin 202. Admin 202 reserves a controlling number of keys based on the authorization scheme of the multisig wallet (e.g., two keys of the 2-of-3 authorization scheme) and maintains them as secret, and shares the remaining (e.g., one) key with owner 2 208. In another example, the multisig wallet 2 210 is automatically generated by the system, and configured to allocate admin 202 the controlling number of keys. In the example, admin 202 now has two keys from each of two wallets (e.g., wallet 206 of owner 1 204, and wallet 210 of owner 2 208). Thus, the plurality of wallets 206, 210, and 214 are associated with a single contingency contract 218.

It should be noted that admin 202 does not have to know the remaining key held by owner 1 204 or owner 2 208 (e.g., the third key of each wallet 206 and 210). Additionally, there is no loss of security if admin 202 does know the third key, because as the majority key holder, he already has control of wallets 206 and 210 by holding a controlling number (e.g., two of three) of keys to each wallet. In another example, the remaining key (e.g., the third key in a 2-of-3 authorization scheme) held by the minority key holders (e.g., owner 1 204 and owner 2 208) is never disclosed to admin 202 in the process of creating wallet 210, and is only directly obtained by the wallet owner, thus offering increased wallet security because the key is shared between fewer people.

In an embodiment, admin 202, or a system in communication with admin 202, keeps track of the fact that wallet 2 210 now has 3 virtual coins from the original 10 coins that are associated with the original contingency event (e.g., the 3 virtual coins carry the "15-day contingency" associated with the original 10 virtual coins), and wallet 1 206 has the other 7. If the contingency event lapses after the contingency period (e.g., no chargeback occurs due to a bounced check at the end of the 15-day contingency period), one of the admin's 202 keys to wallet 1 206 will be shared with owner 1 204, and one of the admin's 202 keys to wallet 2 210 will shared with owner 2 208. Thus, owner 1's 204 status has changed from minority key holder (e.g., having 1 key to 2-of-3 wallet 1 206) to majority key holder, now having a controlling number of keys (e.g., having 2 keys to 2-of-3 wallet 1 206) to access the funds of wallet 1 206. Likewise, owner 2's 208 status has changed from minority key holder (e.g., having 1 key to 2-of-3 wallet 2 208) to majority key holder, now having a controlling number of keys (e.g., having 2 keys to 2-of-3 wallet 2 208) to access the funds of wallet 2 208. Owner 1 204 and owner 2 208 can now, for example, transfer the virtual coins out of the multisig wallets 206 and 210, and into other wallets that are fully private to owner 1 204 and owner 2 206 and not associated or controlled by admin 202.

In the situation where the contingency event occurs within the contingency period (e.g., a chargeback occurs because the check from owner 1 204 bounced within 15 days), admin 202 must collect 7 virtual coins from owner 1 204 and 3 virtual coins from owner 2 208 by using the two controlling keys of each multisig wallet 206 and 210.

In accordance with various embodiments, the sequence of payments of sub-balances from the original virtual coin balance (e.g., the 10 virtual coins) can continue with an unlimited number of subsequent accounts, dispersing the original (e.g., 10) virtual coins by small fractions from the original wallet 1 206, to a "subtree" of other wallets (e.g., wallets 210, 214, etc.). For example, owner 2 208 may make a payment of 0.5 virtual coins to owner N 212. Admin 202, or a system in communication with admin 202, continues to co-sign payments between the subsequent owners (e.g., who hold any portion of admin's 202 original 10 virtual coins).

In an embodiment, the system can automatically control and manage subsequent wallets 206, 210, and 214. In another embodiment, the subsequent wallets 206, 210, and 214 can be controlled by admin 202. In an example, a monitoring or tracking service can be used to ensure acceptable wallet type (e.g., multisig), compliance with contingency periods, generate notifications and/or an activity log, etc. Upon an expiration of the contingency period, if there is compliance with the contingency (e.g., the contingency event occurred, or lapsed, or other did not occur), one of admin's 202 two keys to each wallet 206, 210, and 214 will be released to the respective owners of the wallets. In an embodiment, the contingency period can correspond to a particular date and/or time, asynchronous event, interval of time, etc. Thus, the subsequent wallet owners 204, 208, and 212 will each receive a second key, giving them a controlling number of keys to access the wallet funds. Alternatively, the subsequent wallet owners 204, 208, and 212 can submit the addresses of their new private wallets for the system (or admin 202) to send their virtual coins to. Every virtual coin (e.g., Bitcoin) address has a matching private key, which is saved in the virtual wallet file of the person who owns the balance. The private key is mathematically related to the Bitcoin address, and is designed so that the Bitcoin address can be calculated from the private key, but importantly, the same cannot be done in reverse. In other words, the private key is the "ticket" that allows someone to spend Bitcoins. Addresses to which payments can be sent are derived from public keys by application of a hash function and encoding scheme. The corresponding private keys act as a safeguard and a valid payment message from an address must contain the associated public key and be digitally signed by the associated private key. In certain embodiments, the contingent payment can support either method of finalizing the virtual currency payment upon expiration of the contingency.

Should there be a compliance failure with a contingency (e.g., a chargeback occurs due to a bounced check within the expiration date), admin 202 will retrieve all 10 bitcoins, regardless of where the original virtual coins end up after being transferred by the subsequent owners (e.g., 208, 212) through the subsequent owners' network of multisig wallets. This is because all subsequent wallets to where the original virtual coins are transferred, as well as the amount of the original virtual coins in each subsequent wallet, are tracked by the system. Thus, in this example, admin's 202 controlling pair of keys from wallets 206, 210, and 214 can be used to remove the corresponding amount of virtual coins from each wallet.

Figures 3A, 3B:
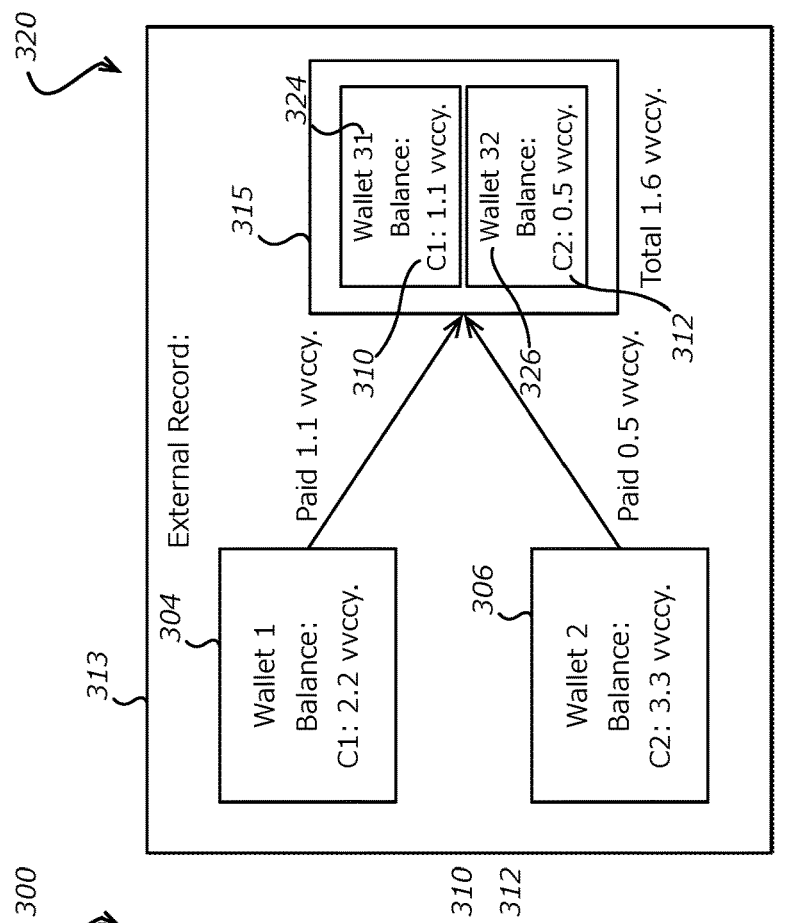
FIGS. 3A and 3B illustrates an example contingency contract in accordance with various embodiments.

FIG. 3A illustrates example 300 for tracking contingency contracts or other contingent transfers of value in accordance with various embodiments. In an embodiment, a contingency contract includes a contingency, for example a contingency of payment (e.g., bank transfers, credit card and personal check payments) or other contingent transfer of value, which can have an expiration date after which the probability of the adverse event (e.g., a chargeback) becomes zero. Each instance of a payment (or other transfer of value) comes with a new expiration date. A contingency contract is thus a record of how many units of virtual currency (or other exchange of value) was paid/transferred in exchange for a contingent payment (the finality of the contingent payment being subject to whether a contingent event occurred or lapsed) or other transfer of value, and the expiration date for the contingency event. For example, an admin account's payment of virtual coins to an owner account is subject to reversal (e.g., chargeback), depending on the owner's contingent payment to the admin account (e.g., owner's fiat payment is a contingent payment because a contingent event may occur or lapse such that the fiat payment is reversed or cancelled). Compliance with the contingency by the expiration date means payment (e.g., of the virtual coins) will finalize, allowing payee (e.g., an owner account) to fully own and access the virtual coins. For example, compliance with a contingency may include when a contingency event lapses (e.g., a personal check does not bounce within 15 days) or occurs (e.g., occurrence of a car accident within the policy coverage period triggers payment of an insurance claim), or does not occur (e.g., a personal check does not bounce within 15 days, no chargeback within an allowable chargeback period, etc.)

A contingency contract can be used to provide an admin and owner(s), for each wallet, the number of coins each contingency expiration date contains, information on whether a wallet can hold coins with multiple contingency expiration dates (e.g., whether the same wallet holds funds from multiple contingency contracts), an activity/transaction feed describing what happens when an owner sends a payment to another owner from such a wallet, tacking information and alerts or notification on the expiration dates, etc.

In an embodiment, the contingency payment system can track each portion of the balance in a wallet which may contain an arbitrary combination of virtual coins from different contingency contracts. Custom records are added to incoming/outgoing blockchain transactions. For example, the expiration date of a contingency contract can be recorded as a "custom" record added to the payment block, using a blockchain opcode such as OP_RETURN output type (e.g., the record could be of type "OP_RETURN"). In the example, this type of record is not counted as "unspent output" of a transaction and can contain arbitrary information that can be used by wallet-management software that is able to understand this type of record. The OP_RETURN record can contain the expiration date of the contingency. Since this record is added to individual transactions, it becomes part of the receiving wallet "inputs" and therefore can track how many coins (e.g., units of virtual currency) of each expiration date are in a single wallet. It should be noted that various other record types may be used and the OP_RETURN record type is merely an example, as those skilled in the art may utilize other approaches to add the details of a contingency contract to a blockchain transaction record.

In certain embodiments, wallet software that can add the OP_RETURN records to the outgoing transactions and be able to read them later may be utilized. Such wallet software can display to the owner the total balance of virtual currency in the wallet and how this balance is made up of sub-balances, individual sub-balances belonging to a different contingency contract that has a different expiration date (and optionally, a different risk of the contingency event occurring.)

An embodiment of such software can display a table showing each sub-balance accompanied by the contingency contract's details. For example, embedded record 307 includes a view of wallet 1 304, wallet 2 306, and wallet 3 302. The record of wallet 3 302 shows that it received two payments. One payment is from wallet 1 304 (of 1.1 virtual currency "vvccy") and another payment is from wallet 2 306 (of 0.5 vvccy). These two payments are bound by different contingency contracts. The payment from wallet 1 304 is bound by a first contingency contract ("C1") and the payment from wallet 2 306 is bound by a second contingency contract ("C2").

In the situation where an owner desires to send some amount out of their wallet, the owner can select which sub-balances (or fractions thereof) of which contingency contract should constitute the amount being sent. For example, wallet 3 302 includes two sub-balances: sub-balance 310 (of 1.1 vvccy) and sub-balance 312 (of 0.5 vvccy). The owner may select all or a portion of sub-balance 310 and/or 312 to be sent. The system can send the user-selected amount and its components as separate sub-transactions (one sub-transaction per a contingency contract) on the blockchain, each with embedded OP_RETURN record of the corresponding contract's details.

FIG. 3B illustrates another example 320 for tracking contingency contracts in accordance with various embodiments. In an embodiment, a management system or admin can be configured to maintain an external (e.g., not directly recorded on the blockchain) log of currency transactions with all accounts associated with a single owner. For example, the admin, or system in communication with the admin, can require that any payment can be sent only to an empty wallet (where the wallet is configured to give admin a controlling number of keys as default). In the example, suppose a first owner account received in a first wallet 10. Bitcoins (e.g., in exchange for a personal check) from an admin account. A second wallet must then be created for a second owner who wishes to receive any of those Bitcoins from the first owner. Therefore, commingling various virtual currency balances from different transactions can be prevented, which could result otherwise from using a single wallet for multiple transactions. In an embodiment, a wallet management system can then aggregate wallets associated with the first owner and display all or a portion of the wallets.

In an embodiment, a single wallet cannot be used in external record 313 since the separate sub-balances (e.g., sub-balance 310 of 1.1 vvccy and sub-balance 312 of 0.5 vvccy) cannot be tagged as bound by their respective contingency contracts (e.g., C1 and C2). Therefore, two separate wallets are created, wallet 31 324 and wallet 32 326, each having only the portion of the overall balance that is bound by a single contingency contract (e.g., C1 or C2). Wallet 31 324 and wallet 32 326 are then collected into an aggregate wallet 315 that reflects the total balance of the wallets combined (e.g., 1.6 vvccy). Accordingly, if the original balance of virtual coins participates in 50 transactions, then 50 new wallets will result in the system. Some owners may have multiple wallets each containing a balance with its own contingency expiration date, but no wallet will contain a mixed balance with multiple expiration dates.

In an embodiment, tracking of the plurality of wallets is transparent, thus an account owner is able to select which sub-balance with which expiration date to transfer. For example, the system or an admin account may keep track of each wallet and their associated contingency contracts through a read-only website or other notification which allows account owners to view details of their wallets. In another embodiment, selection of which sub-balance to transfer may be determined by a configuration record or other configuration information, for example, chronologically ranked by soonest expiration date, etc.

In various embodiments, systems, components, hardware, etc. may utilize policies or other information to ensure that contingency information of the contingency contracts is transparent. For example, in either of the two solutions of representing contingency contracts (e.g., either through a custom transaction record 307 on the blockchain such OP_RETURN and custom wallet software that can write and read it, or through use of separate "commodity" wallets on an external record 313) the funds associated with each owner have a contingent status and a contingency contract associated with them. An owner may be able to accept or reject a virtual currency payment, and be able to examine contingency contract information about that payment. In certain embodiments, the act of acceptance of a virtual currency payment can mean that the owner has read and understood all contract information and that the owner accepts and signs this contract and is now a party to it and it is legally binding upon the owner.

Figure 4:
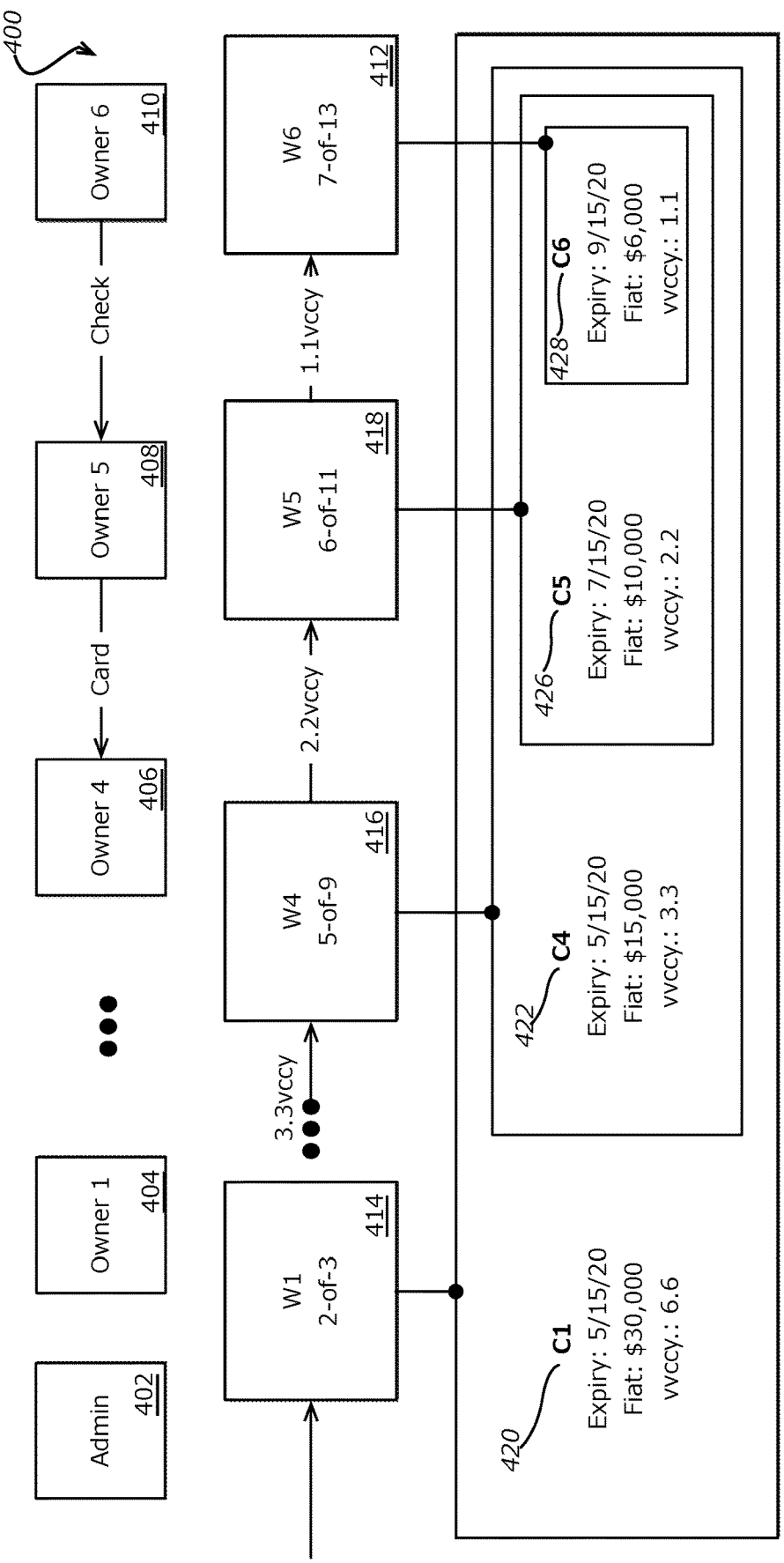
FIG. 4 illustrates an example of contingency transfer of value chaining in accordance with an embodiment.

FIG. 4 illustrates example 400 of contingency transfer of value chaining in accordance with various embodiments. In this example, a contingency chain occurs between a plurality of account holders each having respective virtual wallets. Each pair of consecutive account holders enters a contingency contract, resulting in a chain of contingency contracts. For example, admin 402 and owner 1 404 enter a first contingency contract 420; owner 1 404 and owner 2 (not shown) enter a second contingency contract; owner 2 and owner 3 (not shown) enter a third contingency contract; owner 3 and owner 4 406 enter a fourth contingency contract; owner 4 406 and owner 5 408 enter a fifth contingency contract 422; owner 5 408 and owner 6 410 enter a sixth contingency contract 426, and so forth. In an example, each contingency contract in the chain includes a payment type and contingency expiration date, and the payments (or other transfers of value) involved in the contingency contract become reversible (e.g., contingent) if there is noncompliance with a contingency. For example, admin's 402 virtual currency payment to owner 1 404 becomes reversible (e.g., contingent upon) if owner 1's 404 personal check to admin 402 bounces (e.g., there has been noncompliance with the contingency that the check will not bounce within an expiration date). The balance of each subsequent contingency contract includes an amount lesser or equal to the amount in the preceding (e.g., more senior) contingency contract. For example, if admin 402 pays 10 virtual coins to owner 1 404, then owner 1 404 may subsequently enter into a contingency contract (e.g., C2, not shown) with owner 2 (not shown) with all or a sub-balance of those 10 virtual coins. Owner 2 may subsequently enter a contingency contract (e.g., C3, not shown) with owner 3 and pay owner 3 all or a portion of the balance from C2. This contingency chain may continue with a plurality of subsequent account holders.

In the example, in the first contingency contract (e.g., contract 1) 420, admin 402 sells an amount (e.g., A1) of virtual currency (e.g., A1 Bitcoins) to owner 1 404. In return, admin 402 receives a credit card payment (or any other contingent payment type) from owner 1 404. Wallet 1 414 is created as a multisig 2-of-3 wallet to receive the A1 virtual coins. Admin 402 is allocated a controlling number of keys (e.g., majority key holder, with 2 private keys K11 and K12) to wallet 1 414, while owner 1 404 is a configured as a minority key holder (e.g., receives 1 private key K13).

In a second contingency contract (e.g., contract 2, not shown), owner 1 404 sells some of the virtual currency (e.g., an amount of A2 which is less than or equal to A1) to owner 2 (not shown). In return, owner 1 404 receives a credit card payment from owner 2. Wallet 2 (not shown) is created as a multisig 3-of-5 wallet to receive the A2 virtual coins. Admin 402 is allocated a controlling number of keys (e.g., 3 private keys K21, K22, and K23), while owner 1 404 and owner 2 are each configured as minority key holders (e.g., each has 1 key-K24, K25-respectively).

Because wallet 1 414 is a multisig 2-of-3 wallet, owner 1 404 can transfer any portion of the A1 virtual coins (e.g., in an amount of A2) from wallet 1 414 to wallet 2, by using his key (e.g., K13) and co-signed by admin 402 (e.g., using one of either K11 or K12). Because wallet 2 is a multisig 3-of-5 wallet, owner 2 can transfer any portion of the A2 virtual coins (e.g., in an amount of A3) from wallet 2 to wallet 3, using her key (e.g., K25) and co-signed by both owner 1 (e.g., using his key K24) and admin 402 (e.g., using one of either K21, K22, or K23). Alternatively, owner 2 can transfer virtual coins from wallet 2 by using her key (e.g., K25) and co-signed twice by admin 402 (e.g., using two of his keys among K21, K22, and K23). Thus, the funds in wallet 2 carry two contingencies, and therefore requires additional signatures (e.g., by private keys) from the majority key holder of the most senior contract (e.g., admin 402) or the signature of the contingency contract's other party (e.g., owner 1 for contract 2).

In an embodiment, this pattern continues through the chain of contingency contracts between subsequent account holders. Thus, a sale from owner 2 to owner 3 and wallet 3 would require three co-signers each having their own contingency claim to some or all of the virtual coin balance in wallet 3. Thus, a general formula emerges and can be utilized to enforce a set of policies (e.g., subsequent wallet authorization schemes along the chain of contingency contracts). In order to implement a chain of N contingent contracts (resulting from multiple resales of already-contingent virtual coin amounts in exchange for new contingent fiat payments), with admin 402 selling to owner 1 402, owner1 reselling to owner 2, and owner(N−1) reselling to owner(N), and so forth, will require at each step (i) (with i ranging from 1 to N), where owner(i) receives virtual coins into wallet W (i), for this wallet to be a (i+1)-of-(2i+1) multisig wallet, with i+1 minimum number of keys (of total 2i+1 keys) required to sign a transaction. Additionally, in certain embodiments, i+1 keys will be held by the admin 402, and the remaining i keys will be equally distributed between owners (each owner receiving 1 key).

In the example, once a set of policies is obtained, contingent chaining can be implemented. For example, owner 5 408 has contingent bitcoins that she bought from owner 4 406 (e.g., through contingency contract 5 426), who in turn bought them from owner 3 (e.g., contingency contract 4 422), each such sale having used a contingent fiat payment (e.g., personal check or credit card payment, which are "contingent," as they may reverse due to lack of funds). Owner 5 408 can resell her bitcoins to owner 6 410, who may pay by a credit card and receive the proceeds into his wallet 6 412, which will be created as a 7-of-13 multisig wallet, with admin 402 holding a controlling number of 6 keys and owners 1 through 6 holding a key each. These wallets (e.g., wallet 1 414, wallet 2, wallet 3, wallet 4 416, wallet 5 418, and wallet 6 412) are linked to a chain of contingency contracts (e.g., contract 1 420 through contract 6 428) that were created in the sequence of their numbering, with contract 1 420 being the most senior contract controlling the entire amount of virtual coins, and the rest of the contracts "nested" in each other and controlling an ever-decreasing fraction of the total amount of virtual coins.

In the situation where admin's 402 contingency expiration comes earlier than any of the other contracts in the chain and admin 402 is no longer interested in holding the keys (for example, as he is fully paid), the keys can be revealed to the next holder down the chain (e.g., owner 1 404). Since owner 1 404 now holds more than N+1 keys, she becomes admin 402.

In the situation where admin's 402 contingency has not yet expired, but somewhere down the chain, one of contingencies has now expired, owner(i) (whose contingency has now expired, and who is now fully paid) reveals the keys to the next owner, owner(i+1). Since owner(i+1) now has at least 2 keys (e.g., her own and that of owner(i)), she can initiate a transaction and also co-sign it on behalf of owner (i). However, the owners of other contingencies up the chain, owner(i−1), owner(i−2) . . . owner(1) and the admin still have to co-sign.

In accordance with an embodiment, each new contract C(i) between Owner(i−1) and Owner(i) expires on or after the expiry date of C(i−1). This can occur, for example, when C(i) uses the same type of payment as C(i−1)—for example, a credit card. In another example, different payment types are chained by shorter-to-longer expiration. This protects account holders in a contingency chain from financial risks, for example, a "middleman scam," which can arise when a contingency expires before a more senior contingency. For example, suppose owner 1 makes a $1000 credit card payment for Bitcoins from admin, and has up to 180 days to dispute the credit card charge. Owner 1 resells all of his Bitcoins to owner 2, who paid with a $1000 personal check. In 15 business days, owner 1's bank posts the $1000 check amount to his account and owner 1 withdraws the $1000. Owner 1 then disputes his credit card charge and initiates a chargeback of his $1000 credit card payment. The credit card chargeback triggers reversal of admin's original bitcoin payment. But because the bitcoins have already moved to the wallet of owner 2, admin reclaims his bitcoins (using his multisig keys) from the wallet, and owner 2 has now lost $1000 (through his check payment) and has no bitcoins. Owner 2 is therefore a victim of the middleman scam. In another embodiment, financial risks such as the middleman scam can be mitigated by ensuring full disclosure of the terms and risks of the contingency contract(s) to all account holders.

In an embodiment, when all contingencies expire, the final owner in the chain (e.g., owner(N)), will have (N+1) or more keys revealed to her, because upon expiration of contract C(i), owner(i−1) reveals all keys to owner(i). Therefore, the final owner and is able to spend her bitcoins freely, as no co-signers are required any longer.

In the situation where owner(i) wishes to chargeback her bitcoins from owner(i+1), all co-signers up the chain from owner(i) must co-sign any spending by owner(i) (and from any wallet of which owner(i) has at least one key), so long as two conditions are true. First, the destination wallet is also a wallet from which all co-signers have at least one key. This will hold true for a bitcoin chargeback, because it is a transfer from owner(i+1)'s wallet to owner(i)'s wallet, and the co-signers up the chain (e.g., owner(i−1) all the way up to admin), have a key from both wallets. Second, the contingency contract of the source wallet (e.g., C(i+1)) has not expired. After the contract has expired, a virtual currency chargeback would not be possible.

Generally, as the contingency chain is traversed, the number of controlling keys required for a wallet increases by 1 when a reversible (i.e., contingent) type of fiat payment is used, resulting in one more contingency contract being added to the chain. In another embodiment, the number of keys required to sign a noncontingent transfer from one wallet to another remains constant when a noncontingent payment is made along the chain of contingency contracts. For example, a son buys Bitcoins from an exchange using his credit card, then sells these bitcoins to his father for cash. Since cash is non-refundable, the son does not require a new contingency contract with his father, but the son has his original contingency contract with the exchange because he paid with a credit card. Thus, a 2-of-3 wallet would be needed for the son to receive his bitcoins from the exchange (with the exchange holding 2 keys). When the cash sale happens between the son and the father, the father will be given another 2-of-3 wallet (with, again, 2 keys held by the exchange). In the example, a transfer from the son's 2-of-3 wallet to the father's 2-of-3 wallet can be signed by the exchange. Moreover, the son will not have any keys from the father's wallet, since no contingency contract exists between the father and the son.

Figure 5:
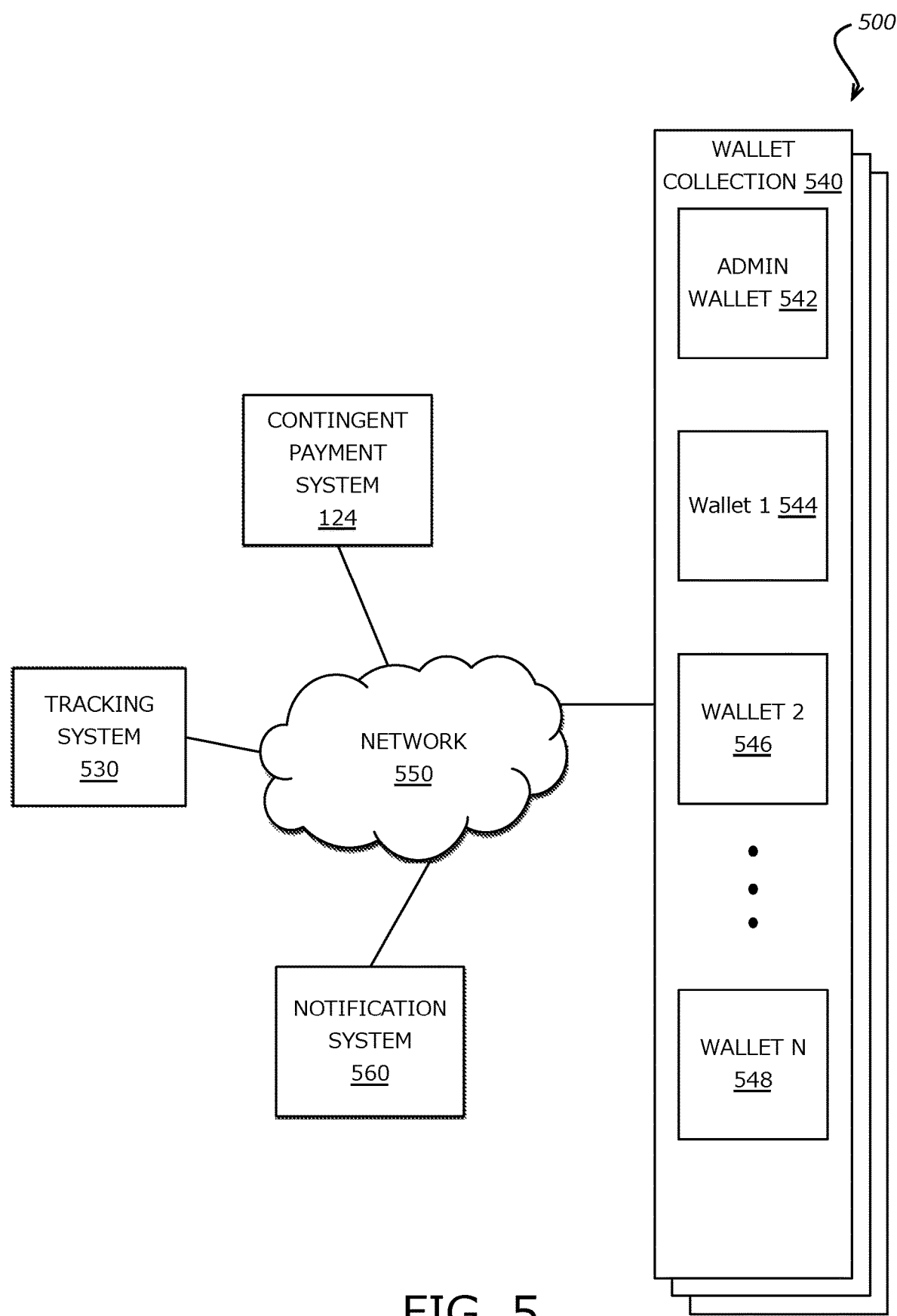
FIG. 5 illustrates an example system for managing contingent transfers of value in accordance with various embodiments.

FIG. 5 illustrates an example 500 of a system for managing contingent transfers of value such as contingent virtual payments in accordance with various embodiments. In this example, network 550 is in communication with contingent payment system 124 (also referred to as a contingent transfer of value system), tracking system 530, wallet collection 540 and communication system 560. The network 550 can include a wired and/or wireless network, as may include the Internet, a cellular network, a local area network (LAN), an Ethernet, an Intranet, and the like.

Contingent payment system 124 is operable to manage contingent (e.g., reversible) payments involving virtual currency. Contingent payment system 124 determines whether there is compliance with a contingency in a contingency contract and manages distribution of private keys for access to virtual funds associated with the contingency contract. A contingency contract includes a virtual currency transaction, a contingency (e.g., whether a contingency event should occur), and a contingency period (e.g., expiration date). In an example, an admin (not shown) and an owner 1 (not shown) can enter into a contingency contract, in which admin pays virtual currency to owner 1, in exchange for owner 1 making a contingent fiat payment (e.g., a credit card payment with the possibility of a chargeback due a credit card dispute) to the admin. The virtual payment is contingent upon the contingent fiat payment (e.g., if there is a chargeback on owner 1's credit card payment within the expiration date, then the admin's virtual payment is reversed).

A contingency is a future event or circumstance (also referred to as a contingency event) which is possible but cannot be predicted with certainty. Realization of the future event or circumstance determines the finality of a payment. Thus, compliance with the contingency means the future circumstance was realized (e.g., a future event occurred, or an adverse future event lapsed) by the expiration date (as governed by the contingency contract) such that the virtual currency payment is finalized and keys (e.g., private keys to virtual wallets holding the virtual currency) are released to the recipient of the virtual currency payment to allow access to the virtual funds. For example, a contingency event can be a credit card chargeback before the expiration date (e.g., within 15 days, 30 days, etc., of a transaction). There would be compliance with the contingency if the contingency event lapses (e.g., no chargeback initiated on the credit card payment) by the expiration date, therefore allowing the virtual payment to finalize (e.g., the virtual payment recipient is allowed to access the virtual funds). Noncompliance with the contingency would result in the reversal of the virtual payment (e.g., the contingency event of the credit card chargeback occurs by the expiration date). In another example, in purchasing goods with virtual currency, delivery of the goods is a contingency event. There would be compliance with the contingency if the contingency event occurs (e.g., the goods are delivered) by the expiration date, therefore allowing the virtual payment to finalize (e.g., the virtual payment recipient is allowed to access the virtual funds). Noncompliance with the contingency results in the reversal of the virtual payment (e.g., the contingency event of the goods delivery lapses—i.e., the goods were not delivered—by the expiration date).

The contingent payment system 124 generates a virtual wallet associated with each account holder (also referred to as user account) for the virtual currency transaction and configures the wallets according to an authorization scheme. In the example, the admin's wallet 542 is a single key wallet (e.g., the single key is allocated to the admin), allowing the admin to freely transfer his virtual coins to owner 1's wallet (e.g., wallet 1 544). However, as owner 1's wallet 544 is the recipient of a balance of the original virtual funds, owner 1's wallet 544 is configured as a 2-of-3 multisig wallet, allocating a controlling number of keys (e.g., 2 keys) to the admin (because he is the original owner of the original virtual funds) and a minority number of keys (e.g., 1 key) to owner 1 (because finality of admin's virtual payment is contingent upon owner 1's contingent fiat payment). Thus, to access the virtual funds in the owner 1's wallet 544, owner 1 (who only has one key) requires a co-signature from admin (e.g., release one key from admin to owner 1). This additional key required by owner 1 will be released to the owner 1 when the virtual payment is finalized (e.g., there is compliance with the contingency, for example, the no chargeback was performed on owner 1's credit card payment, the goods were delivered, etc., by the expiration date). If the virtual payment is reversed (e.g., because there is noncompliance with the contingency, for example, a chargeback on owner 1's credit card payment was performed within 15 days of the transaction, the goods were not delivered, etc.), then the additional key is never released to owner 1, and the admin (who still holds the controlling number of keys to owner 1's wallet 544) accesses owner 1's wallet 544 and retrieves the virtual funds (therefore refunding himself of his virtual payment). Components of the contingent payment system 124 are described in further detail in FIG. 6.

Tracking system 530 is operable to track wallets associated with a plurality of contingency contracts. In an embodiment, tracking system 530 verifies user accounts associated with the plurality of contingency contracts, and reconciles inconsistencies between user accounts, virtual wallets, wallet balances, and expiration dates of contingency contracts. In other embodiments, the tracking system 530 can work along other systems, such as an escrow system based on a multisig wallet, to track virtual wallets and wallet activity associated with a plurality of contingency contracts. Components of tracking system 530 are further described in detail in FIG. 7.

Wallet collection 540 is operable to manage virtual wallets of each account holder (also referred to as user account). Wallet collection 540 can be local to the network 550, remote to the network 550, or a combination thereof. Wallet collection 540 can include wallets 542, 544, 546, 548, and so forth. In other embodiments, wallets 542, 544, 546, 548 can be independent wallets that are not associated with any third-party networks (e.g., Coinbase or other cryptocurrency platforms). A virtual wallet is a cryptocurrency wallet which is automatically generated for each recipient of a virtual currency payment in a contingency contract. Therefore, there can be an unlimited number of wallets, so long as they correspond with a contingency contract. Private keys to the wallet are automatically generated when the wallet is created, and are stored in the wallet. The private keys grant a cryptocurrency user ownership of the funds on a given address (e.g., the virtual wallet). Wallets 542, 544, 546, 548 store private and public keys and interact with various blockchains to enable users to send and receive digital currency and monitor their balance, and can include software-, hardware-, and paper-based wallets. Software wallets can be held on a desktop, mobile or online. Desktop wallets are downloaded and installed (e.g., on a PC or laptop) and can be accessed from a single computer onto which they are downloaded. Online wallets run on a cloud network (e.g., network 550) and are accessible from any computing device in any location. Mobile wallets run on a mobile application, such as on a smartphone, tablet, or other portable computing device. Hardware wallets store a user's private keys on a hardware device, such as a USB drive. Although hardware wallets make transactions online, they are stored offline for increased security. Hardware wallets can be compatible with several web interfaces and can support different currencies. Paper wallets can refer to a physical copy (e.g., printout) of the public and private keys associated with the wallet. Paper wallets can also refer to a piece of software that is used to securely generate a pair of keys which are then printed. When sending from a software-based wallet, the software signs the transaction with a private key, indicating to the blockchain network that the wallet holder has the authority to transfer the funds on the wallet's address.

Notification system 560 is operable to provide reports and/or notifications a user or other appropriate entity relating to the status of the contingent payment system. A report or notification may inform a user, such as an account holder or financial management institution, an activity list of transactions between a plurality of the virtual wallets, the status of a contingency contract, the current balance of a virtual wallet, the history of transactions between user accounts in a contingency chain, and so forth. Notification system 560 may provide system information, for example, through a graphical user interface. Notification system 560 may be implemented by one or more server computing devices. In an example, each server computing device may include at least a processing unit and a system memory for executing computer-readable instructions (e.g., a contingency payment system and contingency payment tracking system application) for implementing the contingent payment system 124 and tracking system 530. Notification system 560 may provide an interface to enable users to engage in contingency contracts with virtual currency transactions. For instance, users may initiate, negotiate, agree, verify, exchange currency, and/or engage with respect to a contingency contract with other users via the contingent payment system 124.

Figure 6:
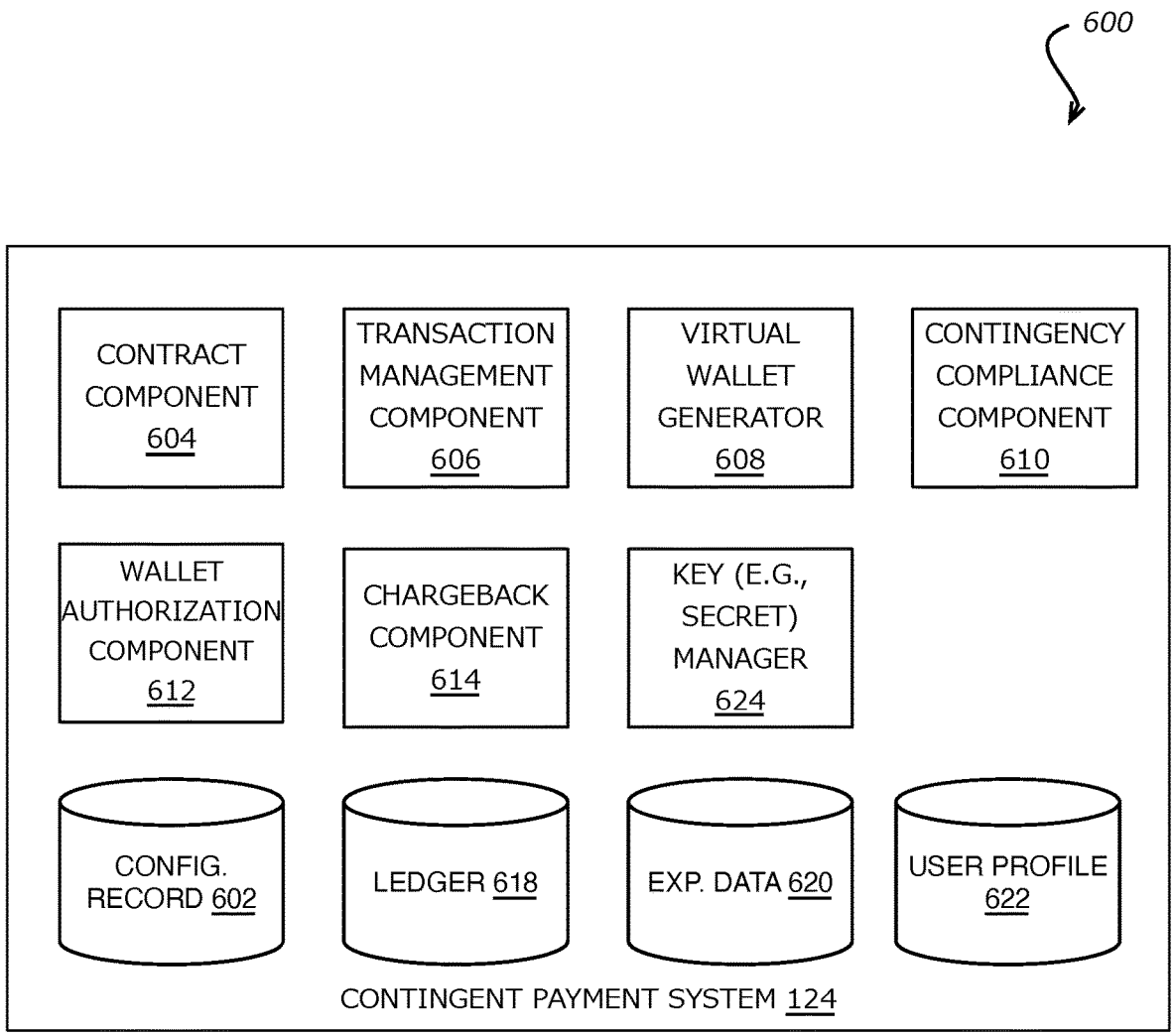
FIG. 6 illustrates an example contingent payment system in accordance with various embodiments.

FIG. 6 illustrates example 600 of a contingent payment system 124 in accordance with various embodiments. Contingent payment system 124 (also referred to as a contingent transfer of value system) includes configuration record data store 602, ledger data store 618, expiration data store 620, user profile data store 622, contract component 604, transaction management component 606, virtual wallet generator 608, contingency compliance component 610, wallet authorization component 612, and chargeback component 614. It should be noted that although the data stores are shown as separate data stores, data from the data stores can be maintained across fewer or additional data stores.

Virtual wallet authorization schemes may be stored in configuration record data store 602. The virtual wallets of the account holders (also referred to as user accounts or owner accounts) can be multi-signature (multisig) wallets, and can be configured with keys (e.g., private keys) and a particular authorization scheme. For example, a multisig wallet associated with a recipient of a virtual currency payment can be configured with three keys and a 2-of-3 authorization scheme. A quorum (e.g., a controlling number of keys for access to the wallet) is set for the wallet. In the example, a quorum for the 2-of-3 multisig wallet requires 2 or more keys (e.g., digital signatures) to access the funds in the wallet. Other authorization schemes can be used, for example, 2-of-2 (requiring both keys in a quorum to unlock the wallet), 1-of-2 (any one of two keys can unlock the wallet), and so forth.

In another embodiment, contingency chaining policies may also be stored in configuration record data store 602. For example, contingency chaining policies may be included in or otherwise referenced by a configuration record or other configuration data. The configuration record, for example, can be used to facilitate virtual currency transactions between virtual wallets. For example, the configuration record may specify an authorization scheme for the secret keys (e.g., private key information). The authorization scheme specifies for various virtual wallet configurations the number of secret keys to transfer, trigging events for the transfer, etc. The configuration record can further include a number of policies describing interactions between account holders (also referred to as user accounts), timing information for charge back events, verification requirements for virtual wallets, probability of chargeback thresholds, etc. A contingency chain occurs between a plurality of account holders each having respective virtual wallets. In a contingency chain, the virtual funds in a virtual wallet associated with a contingency contract is derived from (e.g., can be traced back to) an original amount of virtual funds in a previous virtual wallet associated with a previous contingency contract. For example, an admin and owner 1 enter a first contingency contract associated with an original amount of virtual funds. In turn, owner 1 uses those virtual funds from the first contingency contract to enter into a second contingency contract with owner 2. Subsequent contingency contracts (involving an ever-decreasing fraction of the original amount of virtual funds) continue to be "nested" in the previous contingency contract, resulting in a contingency chain. In the example, the system may determine a contingent chaining policy which includes a dynamic authorization scheme for wallets associated with "nested" contingency contracts. For example, the system may determine a (i+1)-of-(2i+1) authorization scheme for subsequent wallets for each new (nested) contingency contract between subsequent users. For example, a first wallet is configured as a 2-of-3 multisig wallet, the second wallet as a 3-of-5 multisig wallet, the third wallet as a 4-of-7 wallet, and so forth.

User profile data store 622 is operable to store settings relating to key assignments. For example, for each virtual wallet, a majority key holder and minority key holder(s) can be assigned. A majority key holder is allocated a controlling number of keys, for example, an admin who is the original owner of the original balance of virtual funds. A minority key holder(s) has less than a quorum, and requires co-signature (e.g., other key holders to release at least one key to the minority key holder) for wallet access, for example, the recipient of virtual currency payment who must wait for contingency compliance before the virtual currency payment is finalized. User profile data store 622 may also store information associated with a user's financial policies, for example, the type of credit card they are using in a contingency contract and the credit card company's dispute and chargeback dates (e.g., 60 days, 180 days, etc., to dispute a credit card charge before reversal of a credit card payment).

Ledger data store 618 is operable to store records of contingency contracts. A contingency contract includes a virtual currency transaction (e.g., virtual currency payment), a contingency (e.g., whether a contingency event should occur or lapse in order for the virtual currency payment to finalize), and a contingency period (e.g., expiration date). For each contingency contract, ledger data store 618 maintains track of the associated user accounts, associated virtual wallets, wallet balance, the contract's contingency event, compliance policy (e.g., whether finalizing virtual payment requires occurrence or lapse of the contingency event), and so forth. The contingency contract's expiration date (also referred to as the contingency period) is stored in expiration data store 620.

Contract component 604 is operable to create a contingency contract between users. When a contingency contract is created, an expiration date is generated. The expiration date can be a time threshold or time period during which a contingency event must occur (or lapse) in order for a virtual currency payment to finalize. The responsibilities of each user are identified, for example, admin is responsible for sending 10. Bitcoins to owner 1, while owner 1 is responsible for sending a fiat currency payment of $35,000 to admin. A contingency event is identified and associated with the contract, for example, the possibility that the personal check for $35,000 may bounce. A contingency compliance policy is created, which determines that the virtual payment can be finalized (e.g., owner 1 can access the 10 Bitcoins) if the contingency event occurs or lapses (e.g., in this example, compliance is when the contingency event of the check bouncing lapses). A contingency event is identified (e.g., check bouncing) and a contingency compliance policy is derived from the type of contingency event that is expected to occur or lapse. For example, the contingency event of a check bouncing is an adverse event that is expected to not occur (e.g., lapse) in order for the virtual currency payment to finalize. Thus, a contingency compliance policy will include instructions to trigger release of private keys for wallet access when the contingency event of a check has not bounced by the expiration date.

Virtual wallet generator 608 is operable to generate virtual wallets associated with a contingency contract for the recipient of the virtual currency payment. In an embodiment, a wallet is configured with an authorization scheme according to a configuration record or other configuration data. For example, in a contingency contract between admin 1 and owner 1, virtual wallet generator 608 creates a virtual wallet (e.g., wallet 1) for owner 1 to receive the virtual funds, and configures wallet 1 as a 2-of-3 multisig wallet. However, owner 1 cannot yet access the funds until authorized by key manager 624. Wallet 1 can be used again by owner 1 if owner 1 is the recipient of another set of virtual funds from another contingency contract (e.g., owner 1 and admin 2 enter a contingency contract and admin 2 sends virtual currency to owner 1).

In another embodiment, a new wallet is created for each contingency contract, as opposed to each virtual currency recipient (e.g., each account holder). For example, owner 2 enters a contingency contract with admin 2 and receives a first virtual currency payment. Virtual wallet generator 608 generates a new virtual 2-of-3 multisig wallet for owner 2 to receive the virtual funds from admin 2. Then, owner 2 enters a contingency contract with owner 1, which is the second nested contingency contract in a contingency chain (e.g., owner 1 previously received virtual currency from admin 1 in a previous contract, and owner 1 now pays a portion of the virtual currency to owner 2). Virtual wallet generator 608 generates a second wallet for owner 2, and because it is associated with the second contract along the contingency chain, virtual wallet generator 608 configures it as a 3-of-5 multisig wallet. Thus, owner 2 is associated with two virtual wallets for two separate contracts.

Transaction management component 606 is operable to transfer virtual currency between virtual wallets. Each contract involves two transactions-a first user sends virtual currency to a second user, in exchange for the second user sending the first user a contingent payment. For example, a contingent payment may include a contingent fiat payment (e.g., personal check, credit card payment that can be charged back or reversed, etc.), goods or services, another virtual payment (e.g., Bitcoin, Ethereum, etc.), and so forth. Transaction management component 606 facilitates the transfer of the funds for each transaction. For example, admin and owner 1 enter a contingency contract in which admin sends owner virtual currency (e.g., 10 Bitcoins) in exchange for owner 1 sending a contingent fiat payment (e.g., $35,000 personal check). In the example, transaction component 606 transfers the 10 Bitcoins from admin's virtual wallet and into owner's virtual wallet. However, owner 1 cannot yet access the funds of his wallet until the contingency is complied with and the key manager 624 releases enough keys to make owner 1 a majority key holder to his wallet.

Key manager 624 is operable to track and monitor keys among the plurality of virtual wallets. Key manager 624 allocates keys to each user (e.g., account holder) according to the appropriate authorization scheme applied to the contract (e.g., as configured by a configuration record). For example, in a 2-of-3 multisig wallet, key manager 624 transfers the controlling two keys to the virtual currency sender (e.g., admin) and the remaining single key to the virtual currency recipient (e.g., owner 1). In the situation where there is compliance with the contingency, key manager 624 releases one of the majority key holder's (e.g., admin) keys and sends it to the virtual currency recipient (e.g., owner 1), such that the virtual currency recipient has enough keys to unlock his wallet. In the situation where there is noncompliance with the contingency, key manager 624 leaves the controlling number of keys with the majority key holder. In another example, noncompliance with a contingency causes key manager 624 to destroy the virtual currency recipient's key, and/or destroy all keys associated with the recipient's wallet, after the virtual currency sender (e.g., admin) retrieves his virtual funds from the recipient's wallet.

In an embodiment, for a wallet associated with a nested contract along a contingency chain (for example, a 5-of-9 wallet between admin, owner 1, owner 2, owner 3, and owner 4) for a fourth contract down a contingency chain, key manager 624 distributes keys to the appropriate account holders according to the contingency chaining policy stored in configuration record data store 602. In the example, key manager 624 distributes the controlling number of keys (e.g., 5) to the original holder of the total original virtual funds (e.g., admin), and 1 key each to the remaining owners associated with the contingency contract chain up through the contract associate with the 5-of-9 wallet (e.g., 1 key each to owner 1, owner 2, owner 3, and owner 4). In the situation where there is compliance with all contingencies of the four contracts in the contingency chain, key manager 624 releases 4 keys from admin to owner 4, making owner 4 the majority key holder. In another embodiment, key manager 624 can release 1 key from each of admin, owner 1, owner 2, and owner 3, and deliver a total of 4 keys to owner 4. The decision whether to take the 4 keys from admin or 1 key from each from the previous four user accounts (e.g., admin, owner 1, owner 2, and owner 3) may be determined by an authorization scheme in the configuration record, may be set manually, may be set by user preferences in a user profile stored in user profile data store 622 (e.g., if admin prefers to retain most of his keys, key manager 624 may take 1 key from each of the four users instead of all 4 keys directly from admin), and so forth.

In an embodiment, if there is noncompliance with a contingency, key manager 624 destroys the keys to a virtual wallet within a predetermined time period after the expiration date. If there is compliance with a contingency, key manager 624 releases the keys to the virtual currency recipient within the predetermined time period after the expiration date. Key manager 624 may request admin to release all 4 keys and if admin fails to respond within the predetermined time period, key manager 624 may automatically release 1 key from admin and 1 key each from owner 1, owner 2, and owner 3. In another example, once key manager 624 transfers the appropriate number of keys to the make the virtual currency recipient a majority key holder, there may be a predetermined time period during which the recipient may hold the key and access the funds before key manager 624 automatically returns the keys to the virtual currency sender (e.g., admin) or destroys the keys.

Contingency compliance component 610 is operable to determine whether there has been compliance with a contingency period (e.g., by the contingency event's expiration date). Contingency compliance component 610 analyzes a ledger, for example a ledger stored in ledger data store 618, to identify the compliance policy of a contract. For example, in a contract, the finality of a virtual currency payment can be contingent upon the successful completion of a fiat currency payment within a contingency period (e.g., personal check payment does not bounce after 15 days, credit card payment does not get charged back within 180 days, etc.). On the expiration date, contingency compliance component 610 checks whether the contingency compliance policy has been satisfied (e.g., there has been compliance with the contingency). If so, contingency compliance component 610 communicates with wallet authorization component 612 to allow the virtual currency recipient to access the wallet. Wallet authorization component 612 will check the authorization scheme of the wallet and authorize key manager 624 to release the appropriate number of keys to the appropriate virtual currency recipient. Otherwise, if there has been noncompliance on the expiration date, contingency compliance component 610 communicates with chargeback component 614 to initiate a reversal of the virtual currency payment. Chargeback component 614 communicates with key manager 624 to disable release of any keys, retrieves the virtual funds from the wallet and transfers the virtual funds back to the wallet of the virtual currency sender.

Figure 7:
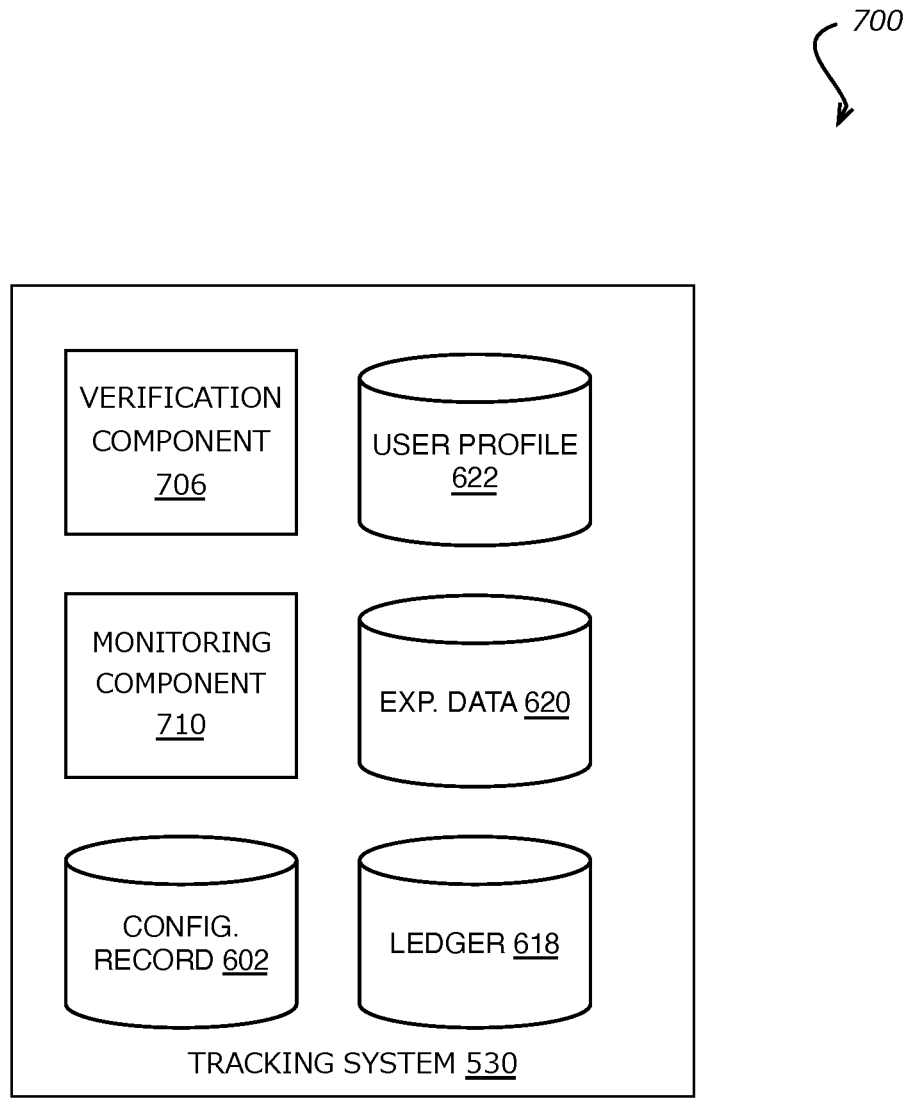
FIG. 7 illustrates an example tracking system for contingent transfers of value in accordance with various embodiments.

FIG. 7 illustrates an example 700 of tracking system 530 for contingent transfers of value such as contingent virtual payments in accordance with various embodiments. In an embodiment, tracking system 530 includes configuration record data store 602, ledger data store 618, user profile data store 622, verification component 706, and monitoring component 710. It should be noted that although the data stores are shown as separate data stores, data from the data stores can be maintained across fewer or additional data stores. The data stores can be accessed by at least verification component 706 and monitoring component 710 in order to perform the functionality of the corresponding component; other components, systems, services, etc. may access the data stores.

Tracking system 530 tracks and verifies user accounts associated with a plurality of contingency contracts, and reconciles inconsistencies between user accounts, virtual wallets, wallet balances, and expiration dates of contingency contracts. In other embodiments, the tracking system 530 can work along other systems, such as an escrow system based on a multisig wallet, to track virtual wallets and wallet activity associated with a plurality of contingency contracts.

Virtual wallet authorization schemes may be stored in configuration record data store 602. For example, automated or manually configured settings for virtual wallet authorization schemes (e.g., 2-of-3 multisig wallet, 3-of-5 multisig wallet, etc.) may be added to configuration record data store 602 for each wallet created to receive virtual funds associated with a contingency contract. In another embodiment, contingency chaining policies may also be stored in configuration record data store 602. A contingency chain occurs when virtual funds in a virtual wallet associated with a contingency contract is derived from (e.g., can be tracked back to) an original amount of virtual funds in a previous virtual wallet associated with a previous contingency contract. Each subsequent contingency contract is therefore "nested" in the previous contingency contract. For example, the system may determine a (i+1)-of-(2i+1) authorization scheme for subsequent wallets for each new (nested) contingency contract between subsequent users. For example, a first wallet is configured as a 2-of-3 multisig wallet, the second wallet as a 3-of-5 multisig wallet, the third wallet as a 4-of-7 wallet, and so forth.

In an embodiment, a configuration record can include balance management policies for a virtual wallet. For example, as described, the configuration record, for example, can be used to facilitate virtual currency transactions between virtual wallets. For example, the configuration record may specify an authorization scheme for the secret keys (e.g., private key information). The authorization scheme specifies for various virtual wallet configurations the number of secret keys to transfer, trigging events for the transfer, etc. A virtual wallet may have funds received from different transactions associated with a plurality of contingency contracts. For example, an owner 1 can receive virtual currency payment in a contract 1 with admin, and simultaneously receive virtual currency payment from owner 2 in a contract 2. Owner 1 therefore has two sub-balances in his wallet associated with two different contingency contracts. When owner 1 engages in a contract 3 with owner 3, wherein owner 1 sends virtual currency to owner 3, a balance management policy may include settings for which sub-balance in owner 2's wallet to draw from for the payment to owner 3. In another embodiment, the hierarchy of which sub-balance to draw from can be manually selected or stored as user preferences in user profile data store 622. User profile data store 622 may also include a user's personal details such as personal identification, date of birth, social security number, and so forth, for verification purposes. For example, as discussed in detail below, verification component 706 may use a user's personal details to verify the user before releasing private keys for the user to access his virtual wallet.

Ledger data store 618 is operable to store records of contingency contracts. A contingency contract includes a virtual currency transaction (e.g., virtual currency payment), a contingency (e.g., whether a contingency event should occur or lapse in order for the virtual currency payment to finalize), and a contingency period (e.g., expiration date). For each contingency contract, ledger data store 618 keeps track of the associated user accounts, associated virtual wallets, wallet balance, the contract's contingency event, compliance policy (e.g., whether finalizing virtual payment requires occurrence or lapse of the contingency event), and so forth. The contingency contract's expiration date (also referred to as the contingency period) is stored in expiration data store 620. Ledger data store 618 also lists contingency chain history. For example, an original virtual balance of 10 Bitcoins is exchanged in a contingency contract. A first sub-balance (e.g., 9 of the 10 Bitcoins) participates in a second contingency contract, and a second sub-balance (e.g., 8 of the 9 Bitcoins) of the first sub-balance participates in a third contingency contract, and so forth. A new virtual wallet is generated and associated with each nested sub-balance along the contingency chain (also referred to as contingency contract chain). Ledger data store 618 includes a lineage of all virtual wallets associated with a chain of contingency contracts, the contingency events of each contract, balances of each wallet, etc. Expiration data store 620 includes expiration dates of all contingency contracts, including contingency chain expiration dates. For example, contingency chain records in expiration data store 620 identify which expiration dates (of nested contingency contract) are derived from or depend on which expiration dates in a more senior (e.g., previous) contingency contract.

Verification component 706 is operable to verify the type of virtual wallet and the owner of a virtual wallet. In an example, a virtual wallet has at least one public key (also known as the wallet address). Addresses to which virtual currency payments can be sent are derived from public keys through application of a hash function and encoding scheme. The public key (wallet address) of each virtual wallet is compared against the wallet address of the associated owner in user profile data store 622 to confirm the correct virtual wallet address to which to send the virtual currency payment in a contingency contract. A private key is a secret number that is generated upon the creation of a virtual wallet, and allows access to the funds in the virtual wallet. The private key is mathematically related to the wallet address (e.g., public key), and is designed such that the wallet address can be derived from the private key. A multisig wallet can have multiple (numerically different) private keys, which are kept secret and used for authentication and encryption of the virtual wallet. Because anyone with a private key can spend all of the virtual funds associated with the corresponding wallet address, the essence of virtual currency security is protection of private keys. Thus, verification component 706 verifies the type of wallet (e.g., authorization scheme) a virtual wallet is, to confirm the correct number of keys (and the correct key that matches the wallet) required before anyone is allowed to access the wallet. Further, when a private key is released to the recipient of a virtual wallet, verification component 706 verifies that the private keys are delivered to the correct account holder to access the virtual funds.

In an embodiment, verification component protects against unauthorized recalls of virtual funds by the virtual currency payor. For example, suppose an admin and owner 1 enter into a contingency contract, wherein admin sends a virtual currency payment to owner 1 at a 2-of-3 multisig wallet. After the contingency date has expired but during a time before the key is released to owner 1, admin may utilize his two keys to perform an unauthorized callback of the coins in owner 1's wallet. Therefore, in an embodiment, verification component 706 can check during the transition period after the contingency compliance is confirmed, but before the key(s) is actually released to the recipient (e.g., owner 1), the verification component 706 makes sure (e.g., temporarily disables) the sender's (e.g., admin) ability to use his controlling set of keys to make an unauthorized reversal of his original virtual currency payment.

In another example, conventional systems of credit card chargebacks allow for a fraudulent consumer to initiate an unfair and undeserved chargeback against a merchant and receive the money back every time with near complete certainty, resulting in a total loss for the merchant. In accordance with various embodiments, verification component 706 allows merchants to take control and chargeback virtual currency payments by verifying that if one transaction in the contingency contract (e.g., contingent fiat payment) is finalized, and the other transaction (e.g., virtual currency payment) fails to finalize within a predetermined time threshold, then both transactions may be reversed. This allows for the ability of a virtual currency chargeback as a deterrent against fraudulent fiat currency chargebacks. That is, the fiat chargeback mechanism can be used to receive back fiat funds in case of cheating by a virtual currency payor (e.g., admin), and upon expiration of the contingency, the virtual funds can be moved to more secure private wallets by owners.

Accordingly, embodiments allow for shifting of the risk of chargeback from admin (the original seller of virtual currency for fiat currency) down the payment sequence of a plurality of account holders (e.g., to owner 1, owner 2, through owner N). For example, owner 1 buys 10 Bitcoins from admin. Owner 1 then pays 3 of those Bitcoins to owner 2 in exchange for services. Owner 1 owns the bank account from which he wrote a personal check payable to admin. If owner1's check bounces (e.g., there is noncompliance with the contingency) and admin fails to receive his fiat payment within the contingency period (e.g., 15 days), both owner 1 and owner 2 will lose their Bitcoins. Therefore, when owner 2 receives Bitcoins from owner 1, owner 2 faces a counterparty risk, whereby owner 2 needs to trust owner 1 that the contingency related to these Bitcoins will be complied with (e.g., owner 1's bank check will not bounce). In the situation where a contingent payments system is not used and admin sends 10 bitcoins to a regular non-multisig wallet that admin does not control (e.g., only owner 1 has the key), admin faces the counterparty risk of owner 1, and should there be noncompliance with the contingency within the contingency period (e.g., the contingency event of the check bouncing occurs), admin will experience the entire loss due to the fiat chargeback.

In various embodiments, verification component 706 may require additional information (e.g., personal identification, date of birth and even a social security number) when an account holder makes a contingent fiat payment for a contingency contract. Such an additional verification layer for contingent fiat payments reduces the probability of (fiat) chargebacks. In another example, suppose owner 1 purchases Bitcoins from admin using a credit card, and then sell all of the Bitcoins to owner 2 in exchange for cash from owner 2. Owner 1 then initiates a credit card chargeback and receives back all his fiat funds. In the example, verification component 706 may prohibit cash payments and instead require owner 2 to make the payment via a credit card. This is because by paying cash to owner 1, owner 2 is exchanging a non-reversible payment (e.g., cash) for a reversible payment (e.g., a contingent virtual currency). If owner 2 otherwise accepts the contingent virtual currency payment into his multisig wallet, he now has assumed the entire counterparty risk for the virtual coins he received. In another embodiment, verification component 706 may publish a credit score, likelihood of contingency noncompliance, or the like for each account holder to predict the possibility of a fraudulent chargeback performed by the account holder, and account holders whose credit scores fall within a predetermined range may be prohibited from making cash payments.

Monitoring component 710 is operable to activity between the plurality of virtual wallets, including monitoring contingency events, expiration of the events, and expiration of keys, among others. In embodiment, monitoring component 710 monitors the expiration dates of contingency events, and compliance with contingencies. For example, on the expiration date of a contract, monitoring component 710 detects whether there has been compliance with a contingency. For example, if a contingency period is 15 days, then on the 15th day after the creation of the contingency contract, monitoring component 710 checks whether an adverse contingency event has lapsed (e.g., a personal check did not bounce), or whether a desirable contingency event has occurred (e.g., goods were delivered) as according to the compliance policy as set forth in the configuration record. If monitoring component 710 detects contingency compliance within the contingency period, it notifies contingent payment system 124 to release the appropriate keys to the virtual currency recipient accordingly. In another example, in a contingency contract chain, monitoring component 710 detects when different contracts along a contingency contract chain have different expiration dates or have experienced contingency compliance (or contingency noncompliance) sooner than other contracts earlier and/or later in the chain. For example, in the situation where monitoring component 710 detects that admin's contingency expiration comes earlier than any of the other contracts in the chain and admin is no longer interested in holding the keys (for example, as he is fully paid), verification component 706 reveals the keys (of admin) to the next holder down the chain (e.g., owner 1). In the situation where monitoring component 710 detects admin's contingency has not yet expired, but somewhere down the chain, one of contingencies has now expired, owner(i) (whose contingency has now expired, and who is now fully paid), verification component 706 reveals the keys to the next owner, owner(i+1).

In another embodiment, monitoring component 710 monitors the expiration dates of private keys and detects when an account holder unsuccessfully attempts to access their virtual wallet with a private key which has expired. For example, wallets in a contingency chain may utilize expiring keys based on cryptographic algorithms and protocols, where the key expiration date for each of multi-signature keys has an expiration date beyond which it does not work to co-sign transactions of the wallet. A multisig wallet with temporary keys that can be assigned an expiration date could simplify the management of the expiration of contingency contracts in a contingency chain, making it easy to protect an account holder (e.g., owner(i+1)) from the other account holder to a contingency contract (e.g., owner(i)) initiating a virtual currency chargeback after the contract expiration (e.g., after the fiat payment becomes irreversible). As described, in the absence of temporary key support, the way this risk can be mitigated is by moving funds to a new multisig wallet at the moment monitoring component 710 detects the expiration of a contingency contract, as well as by configuring chaining policies which require that a nested contingency contract (e.g., contract (i+1)) has not expired.

In an embodiment, monitoring component 710 monitors expiring keys, to protect against account holders (e.g., admin) from charging back their virtual currency payments after expiration of the first contingency contact (e.g., contract 1) in a contingency chain, since there is no one above admin in the contingency chain, and since admin always keeps a controlling set of keys from every wallet of the chain. As described, aspects of contingency management can be done either internally (by using fields of the blockchain protocol record, e.g., OP_RETURN or other blockchain opcodes) or externally to the blockchain (by using an external management system). Similarly, monitoring component 710 can manage the moment of expiration of the first (e.g., most senior) contingency contract in a contingency chain by using internal blockchain features such as temporary multisig keys (expiring on the day of expiration of the chain's most senior contingency contract), or by using an external system that would transfer funds to a new wallet upon C1 expiration, a wallet to which admin no longer has a key.

In certain embodiments, there may be situations when monitoring component 710 uses the blockchain opcode of OP_CHECKMULTISIG, in which case the OP_CHECKMULTISIG opcode supports up to 20 participating keys on the Bitcoin network with a practical limit of 15. For example, with the contingency chaining policy of the (n+1)-of-(2n+1) formula, at least one embodiment can use the current Bitcoin network implementation to support a chain of maximum N=7 contingent transactions (with owner 7 having a wallet with 8 of 15 keys required to sign). It should be noted that such monitoring using various blockchain opcodes does not restrict the maximum number of contingent contracts in a contingency chain, as use of other techniques and opcodes could lead to expanding the conventional, practical limit (e.g., of 7 contingent transactions) by nearly 5-fold. Accordingly, there is no theoretical limit to the number multisig keys in a wallet, hence there is no theoretical limit to the number of chained contingencies in a contingency contract chain. Additionally, adoption of various changes in the blockchain protocols that expand byte sizes of fields can lead to further expansion of this maximum.

Figure 8A:
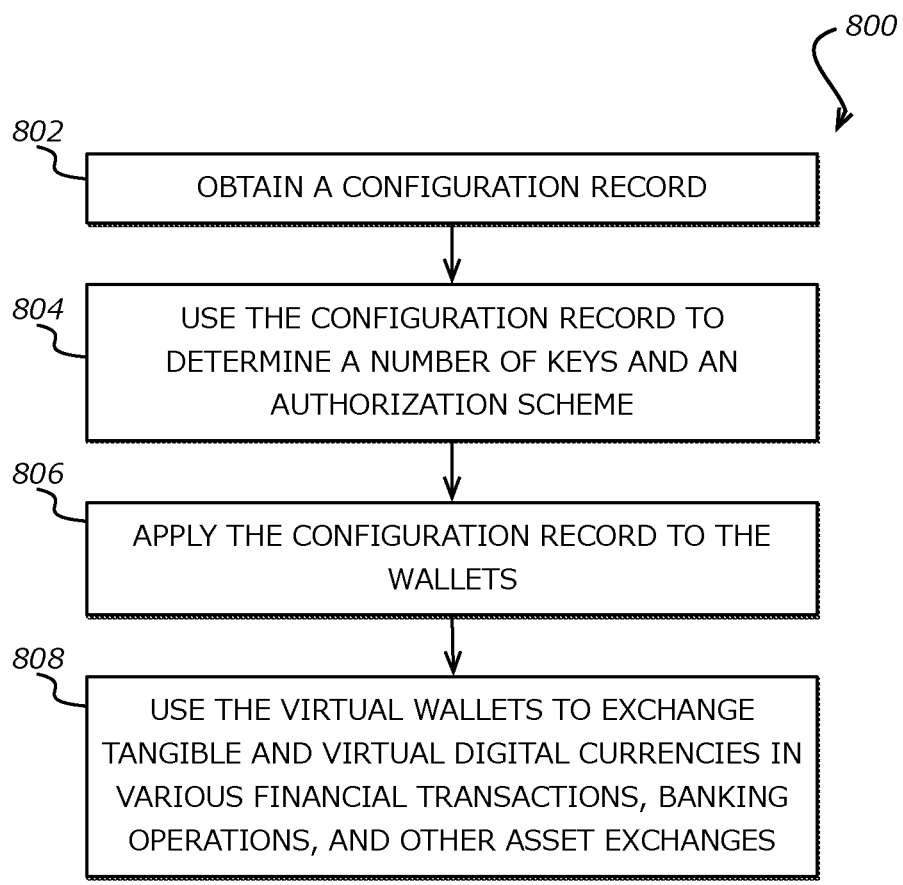
FIGS. 8A and 8B are an example processes for managing contingent transfers of value that can be utilized in accordance with various embodiments.

FIG. 8A illustrates an example process 800 for managing contingent transfers of value such as contingent virtual payments in accordance with various embodiments. It should be understood that, for any process discussed herein, there can be additional, fewer, or alternative steps, performed in similar or different orders, or in parallel, within the scope of the various embodiments unless otherwise stated. In this example, a configuration record for an account associated with a virtual wallet is obtained 802. The configuration record can include a number of policies describing interactions between account holders (also referred to as user accounts), timing information for charge back events, verification requirements for virtual wallets, probability of chargeback thresholds, etc. For example, suppose admin and owner 1 enter into a contingency contract, in which admin sends owner 1 a virtual currency payment (e.g., 10 Bitcoins), in exchange for owner 1 sending a contingent fiat payment (e.g., a personal check for $35,000 which has the possibility of bouncing within a certain time period, for example 15 days). The configuration record can include terms of the contingency contract, which includes details for a virtual currency transaction (e.g., virtual currency payment, the amount of the payment, the sender and recipient of the payment, etc.), a contingency (e.g., whether a contingency event should occur or lapse in order for the virtual currency payment to finalize), and a contingency period (e.g., expiration date). In the example, the positions the account holders are identified in the configuration record (e.g., admin is the virtual currency sender or payor, while owner 1 is the virtual currency recipient). The configuration record also includes a ledger explaining the history of a particular balance of virtual currency (e.g., any previous contingency contracts and transactions with which the virtual funds have been associated, such as in the case of a contingency contract chain).

The configuration record can be used 804 to evaluate at least one virtual wallet of an owner account. Based on the configuration record, keys and an authorization scheme can be determined 804 and applied 806 to the wallets. For example, owner 1 is the recipient of virtual currency funds, a virtual wallet 1 is created for owner 1. Wallet 1 may be configured with a 2-of-3 authorization scheme. Because owner 1 is the recipient, he is made the minority key holder and is given 1 of the three keys to the wallet, but not enough keys to unlock the wallet. Meanwhile, as admin is the virtual currency payor and risks a double financial loss (e.g., he has parted with his virtual funds and there is a possibility owner 1's contingent fiat payment, i.e., personal check, may bounce), admin is made the majority key holder and is allocated a controlling number of keys (e.g., 2 keys) to owner 1's wallet.

In another example, in a contingency contract chain, owner 1 subsequent enters a contingency contract with owner 2. Owner 1 pays a sub-balance of his virtual funds (e.g., 9 of the 10 Bitcoins he received from his contract with admin) to owner 2, in exchange for owner 2 rendering services. Wallet 2 is created for owner 2 to receive the virtual funds (e.g., 9 Bitcoins). The configuration record may include or reference a contingency chain policy, for example, for all subsequent nested contracts in a contingency chain, wallets will be created under a (i+1)-of-(2i+1) authorization scheme. Thus, wallet 2 is configured as a 3-of-5 multisig wallet. When the configuration record is applied 806 to this wallet, owner 1 and owner 2 are each configured as minority key holders (e.g., each receiving 1 key) while admin (e.g., the original owner of all of the virtual funds involved in the contingency chain) is designated as the majority key holder and receives a controlling number of 3 keys to wallet 2.

Thereafter, the virtual wallets can be utilized 808 to exchange tangible and virtual digital currencies or other contingent transfer of value in various financial transactions, banking operations, and other asset exchanges and/or utilized for another purpose such as exchanging an irreversible payment in a virtual currency to a reversible payment in fiat currency or a financial instrument. For example, a contingency event is a future event or circumstance which is possible but cannot be predicted with certainty, but the occurrence (or lapse) of the contingency event determines the finality of a payment. Thus, compliance with the contingency means the contingency event occurred (or an adverse contingency event lapsed) by the expiration date such that the virtual currency payment is finalized and keys are released accordingly to allow access to the virtual currency. In the example, a contingency event can be a bounced personal check before the expiration date (e.g., within 15 days, 30 days, etc., of a transaction). There would be compliance with the contingency if the contingency event lapses (e.g., the personal check does not bounce) by the expiration date, therefore allowing the virtual payment to finalize (e.g., the virtual payment payee is allowed to access the virtual funds). Noncompliance with the contingency would result in the reversal of the virtual payment (e.g., the contingency event of the check bouncing occurs by the expiration date). In another example, in purchasing goods with virtual currency, delivery of the goods is a contingency event. There would be compliance with the contingency if the contingency event occurs (e.g., the goods are delivered)

by the expiration date, therefore allowing the virtual payment to finalize (e.g., the virtual payment payee is allowed to access the virtual funds). Noncompliance with the contingency results in the reversal of the virtual payment (e.g., the contingency event of the goods delivery lapses—i.e., the goods were not delivered—by the expiration date). When the virtual currency payment is finalized, the recipient of the virtual currency payment (e.g., owner 1) is given enough keys to access the virtual funds (e.g., in wallet 1). When the virtual currency payment is reversed, no keys are released to the virtual currency recipient, and the virtual currency payor (e.g., admin) may use the controlling number of keys he already had by default to retrieve his virtual funds, to prevent experiencing the double financial loss.

Figure 8B:
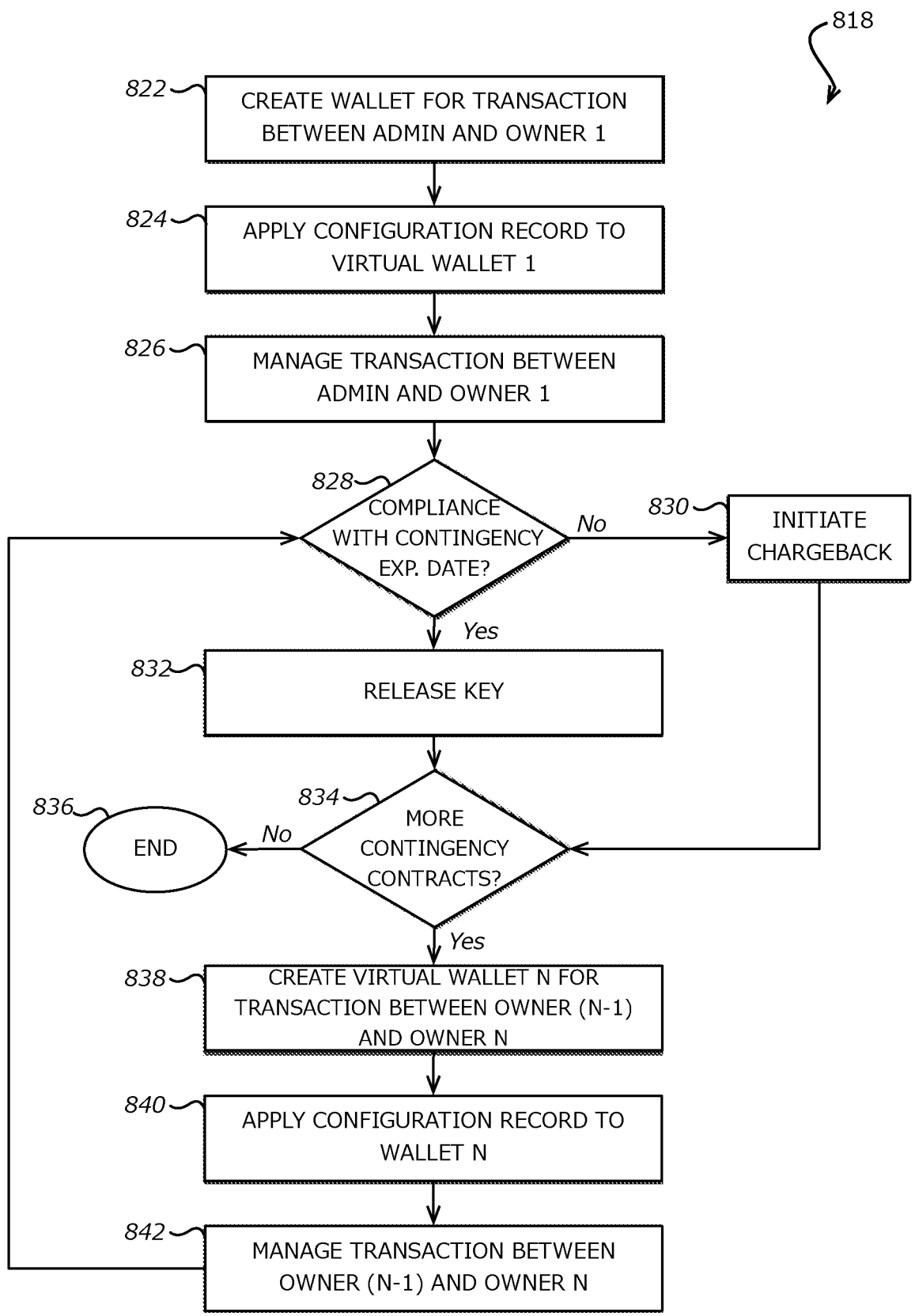

FIG. 8B illustrates another example process 818 for managing contingent transfers of value such as contingent virtual payments in accordance with various embodiments. In this example a wallet (e.g., wallet 1) is created 822 for a transaction between two account holders (e.g., admin and owner 1). The transaction is a virtual currency payment associated with a contingency contract. For example, admin makes a virtual currency payment (e.g., 10 Bitcoins) to owner 1, in exchange for owner 1 sending a contingent fiat payment (e.g., $35,000 with a personal check which has the possibility of bouncing due to lack of funds in the personal checking account). A new virtual wallet is created each time there is a recipient of a virtual currency payment (e.g., wallet 1 for owner 1). Wallet 1 can receive additional virtual funds from other contingency contracts which owner 1 may engage in with other account holders. In other embodiments, a new wallet is created for each contingency contract. Thus, an owner who engages in 5 contingency contracts with different account holders will be associated with 5 different virtual wallets, wherein each wallet can have the same or different authorization scheme.

Wallet configurations from a configuration record are applied 824 to the creation of the wallet. The configuration record can include an authorization scheme. For example, wallet 1 can be configured with three keys and a 2-of-3 authorization scheme, where any two of the three keys can unlock the wallet. The configuration record includes authorization positions of each account holder. For example, for wallet 1, admin, as the virtual currency payor, may be designated a majority key holder and as such, is allocated a controlling number of two keys to unlock the wallet (e.g., to retrieve his virtual funds if a contingent event occurs or lapses, such as owner 1's personal check bouncing). Owner 1 is then designated as minority key holder, and is allocated one key.

The process manages 826 the transaction between admin and owner. The virtual currency payment is transferred from admin's virtual wallet and into owner 1's wallet (e.g., wallet 1). However, as a minority key holder, owner 1 does not yet have access to the funds of his wallet 1. On the expiration date (e.g., expiration of the contingency period), the process determines 828 whether there has been compliance with the contingency. A contingency is complied with if the contingency event occurred (or lapsed) by the expiration date (as governed by the contingency contract or other compliance information), or otherwise did not occur such that the virtual currency payment can finalize. For example, admin's virtual currency payment is contingent upon owner 1's check not bouncing (e.g., the contingency event lapses by the end of the contingency period). In response to determining the contingency requirement is satisfied after the contingency period ends, e.g., when the process confirms that owner 1's check has not bounced 15 days after the transaction, the process determines that there has been compliance with the contingency. Therefore, the process releases 832 the appropriate number of keys (e.g., take one of admin's two keys) to the virtual currency recipient (e.g., give to owner 1), allowing owner 1 to access the virtual funds in the wallet, and thereby granting access to the virtual funds (e.g., cryptocurrency) to owner 1. More specifically, a key secret exchange operation is executed to release the appropriate number of keys from admin to owner 1 such that owner 1 holds a threshold number of keys to access the virtual funds. Thereafter, owner 1 can transfer the virtual funds to a different virtual wallet (e.g., a virtual wallet not under the admin's control) or perform some other action with the virtual currency.

Should there be a compliance failure with a contingency (e.g., a chargeback on owner 1's fiat payment occurs due to a bounced check within the expiration date), the process initiates 830 a chargeback on admin's virtual currency payment. For example, the controlling number of keys remain with the admin, allowing admin to retrieve the virtual coins. In an embodiment, the keys may be destroyed after a time period after admin retrieves his virtual funds from owner 1's wallet. Thus, there can be a time limit for when a financial transaction can be reversed based on the authorization scheme.

In another embodiment, the process may also temporarily disable all keys' ability to unlock the wallet during the contingency period. This is to discourage the virtual currency payor (e.g., admin) from initiating a premature (and unauthorized) chargeback of his virtual funds before the expiration date (e.g., before the process has a chance to evaluate whether there has been compliance with the contingency).

The process continues to check 834 whether there are subsequent contingency contracts nested in a contingency contract chain (also referred to as contingency chain). A contingency chain occurs between a plurality of account holders each having respective virtual wallets. In a contingency chain, the virtual funds in a virtual wallet associated with a contingency contract is derived from (e.g., can be traced back to) an original amount of virtual funds in a previous virtual wallet associated with a previous contingency contract. For example, an admin and owner 1 enter a first contingency contract associated with an original amount of virtual funds. In turn, owner 1 uses those virtual funds from the first contingency contract to enter into a second contingency contract with owner 2. Subsequent contingency contracts (involving the same or an ever-decreasing subbalance of the original amount of virtual funds) continue to be "nested" in the previous contingency contract, resulting in a contingency chain.

In the example, when the process detects additional contingency contracts along a contingency contract chain, a new virtual wallet is created 838 for the virtual currency recipient of the new contract. For example, after admin and owner 1 engage in contract 1, owner 1 and owner 2 engage in a subsequent contingency contract (e.g., contract 2), where owner 1 pays 9 Bitcoins (e.g., of the 10 Bitcoins he received from admin). In exchange, owner 2 makes a $5000 credit card payment to owner 1, with an expiration date in 30 days. A new virtual wallet (e.g., wallet 2) is created. The configuration record may include a contingency chaining policy, which articulates an authorization scheme and key allocation for subsequent wallets in a contingency chain. For example, an authorization scheme of (i+1)-of-(2i+1) may be configured 840 for all wallets associated with subsequent nested contracts in a contingency chain. In this example, because this contract 2 is the second contract nested in a contingency chain, wallet 2 is generated and configured as a 3-of-5 multisig wallet. The original owner of the original balance of virtual funds (e.g., admin) is designated as the majority key holder and is allocated a controlling number of 3 keys. Meanwhile, the subsequent recipients of the virtual funds (e.g., owner 1 and owner 2) are minority key holders to wallet 2, and are each allocated 1 key. However, owner 2 does not yet have access to the funds in his virtual wallet (e.g., wallet 2).

Once the new wallet is created, the process manages 842 the transaction between the latest account holders in the contingency chain. For example, the virtual funds are transferred from owner 1's wallet (e.g., wallet 1) to owner 2's wallet (e.g., wallet 2). On the expiration date of the most recent nested contract, the process determines 828 whether there has been compliance with all of the contingencies up through the current contract. For example, owner 1's virtual currency payment is contingent upon owner 2's credit card payment clearing (e.g., the contingency event lapses by the end of the contingency period of 30 days after contract 2). Additionally, admin's virtual currency payment is contingent upon owner 1's personal check clearing (e.g., the contingency event lapses by the end of the contingency period of 15 days after contract 1). At the end of contract 1's 15-day contingency period, when the process confirms that owner 1's personal check has cleared, the process determines that there has been compliance with the first contingency. The process releases 832 one key from admin and distributes it to owner 1 to access the virtual funds. Next, at the end of contract 2's 30-day contingency period, when the process confirms that owner 2's credit card payment has been cleared, the process determines that there has been compliance with the second contingency. Therefore, the process releases 832 two keys from admin and distributes them to owner 2, allowing owner to access the virtual funds in wallet 2. In another embodiment, the process releases one key from admin and one key from owner 1 and distributes a total of two keys to owner 2, which also enables owner 2 to have enough keys to access the virtual funds in wallet 2.

In the situation where the compliance fails for contingencies of both contracts (e.g., owner 1's check bounces within its contract's contingency period and owner 2's credit card payment is charged back with within its respective contingency period), the process in an embodiment can initiate a chargeback of all virtual funds from both wallet 1 and wallet 2, and return the virtual funds to admin. In the situation where compliance fails for the first contingency (e.g., owner 1's check bounces) but there is compliance for the second contingency (e.g., owner 2's credit card payment clears), the process will retrieve all virtual funds from both wallet 1 and wallet and return them to admin. In the situation where there is compliance for the first contingency (e.g., owner 1's check clears) but compliance fails for the second contingency (e.g., owner 2's credit card payment is reversed), the virtual funds are retrieved from wallet 2 and returned to wallet 1, and admin's key is released to owner 1 to access the virtual funds. In the situation where there are no additional contingency contracts, the process can end 836.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 9:
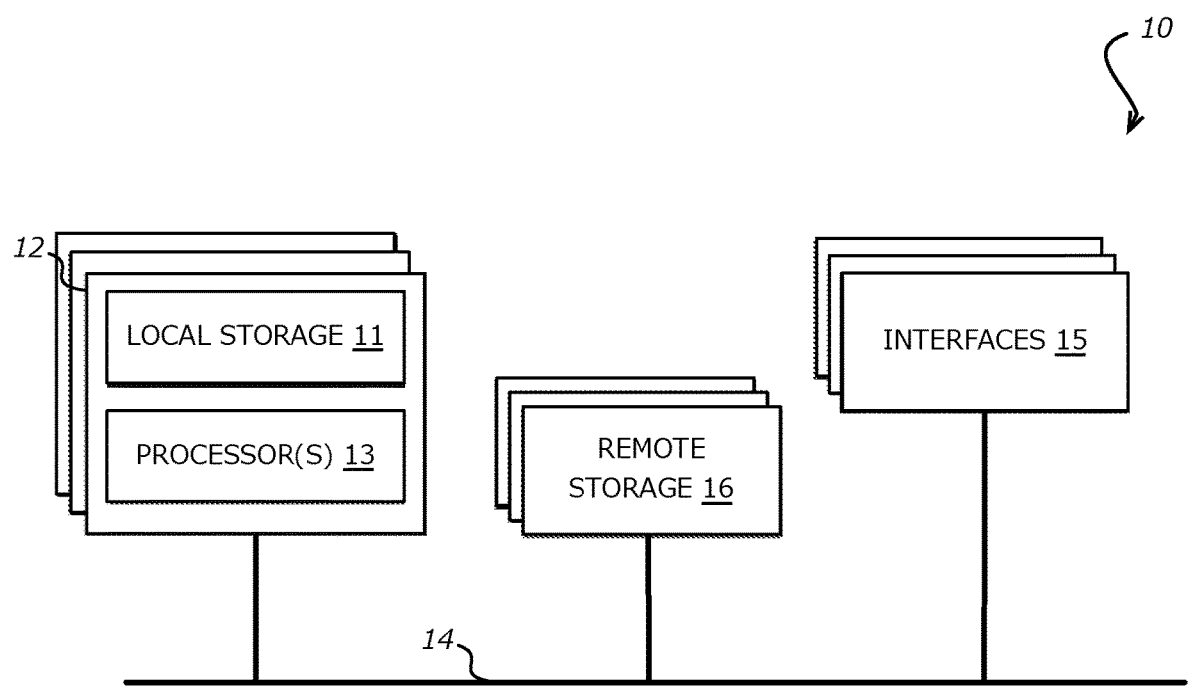
FIG. 9 illustrates components of a computing device that supports an embodiment of the present invention.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memory storage, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
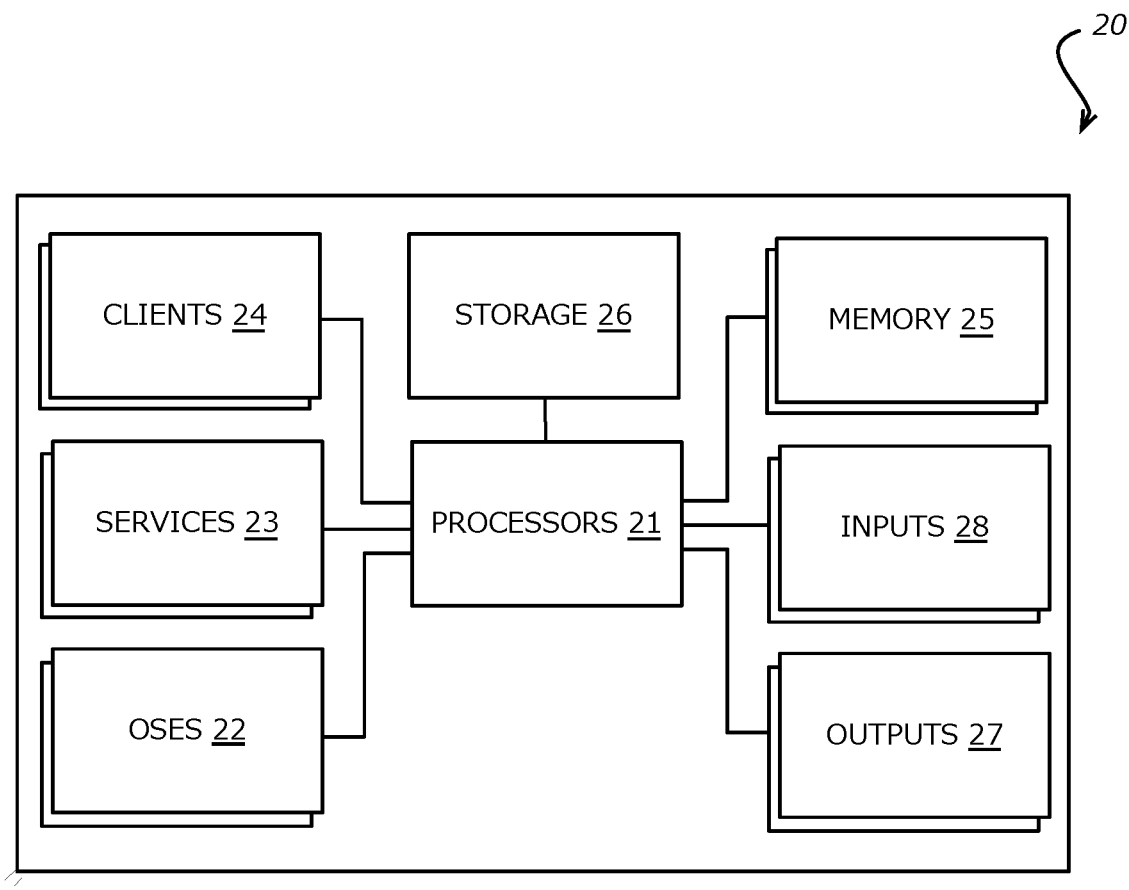
FIG. 10 illustrates an exemplary architecture of a system that supports an embodiment of the present invention.

In some embodiments, systems may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 22. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memory storage, or electrical storage device for storage of data in digital form (such as those described above, referring to FIG. 9). Examples of storage devices 26 include flash memory, magnetic hard drive, CD-ROM, and/or the like.

Figure 11:
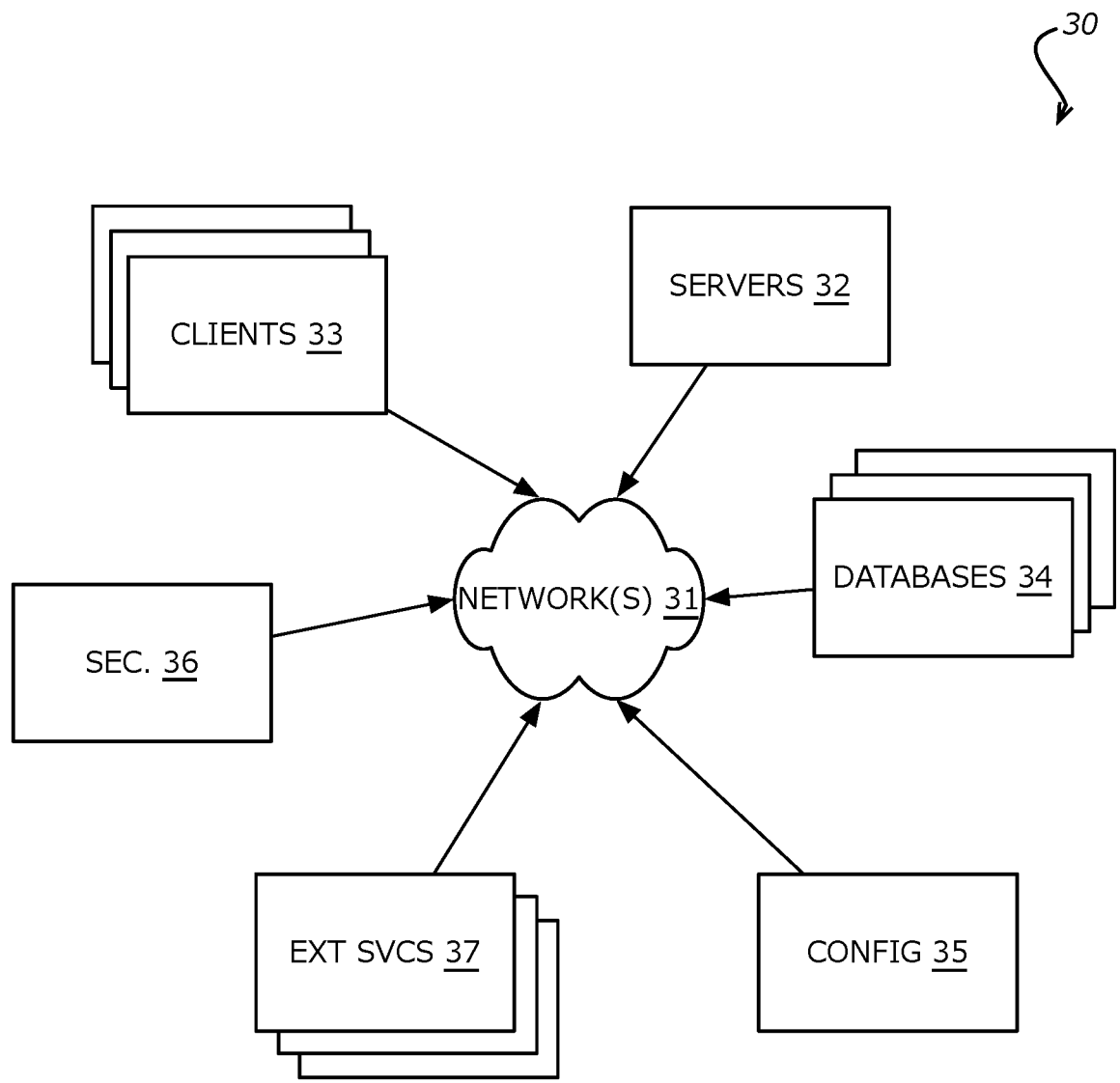
FIG. 11 illustrates another exemplary architecture of a system that supports an embodiment of the present invention.

In some embodiments, systems may be implemented on a distributed computing network, such as one having any number of clients and/or servers. Referring now to FIG. 11, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise webenabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 12:
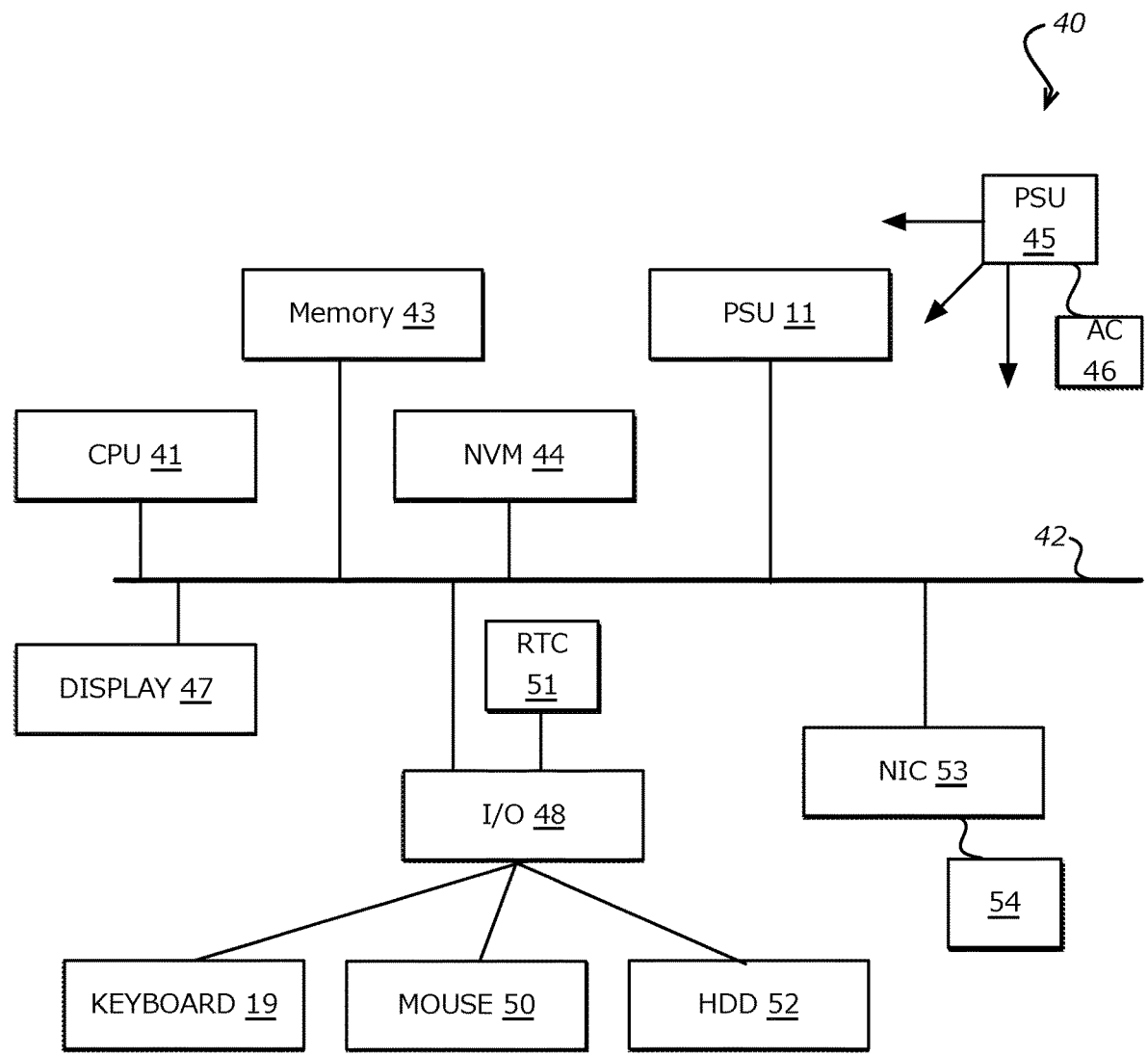
FIG. 12 illustrates components of a computer system that supports an embodiment of the present invention.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 19, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method for providing a contingent transfer of value system utilizing multi-signature wallets, the computer-implemented method comprising:
   obtaining, via at least an application programming interface, a configuration record configured to facilitate contingent transfers of value between a plurality of multi-signature wallets, the plurality of multi-signature wallets including at least a first multi-signature wallet associated with a first user account and a second multi-signature wallet associated with a second user account, wherein the plurality of multi-signature wallets are configured to communicate over a network, the network combining features of both decentralized and centrally-regulated cryptocurrency systems of user accounts in communication with other commercial banking and finance networks and services;
   establishing the first multi-signature wallet and the second multi-signature wallet, individual multi-signature wallets being associated with an authorization scheme that requires a predetermined number of secret keys for authorizing transactions involving respective multi-signature wallets;
   assigning, for the first multi-signature wallet, a majority of the predetermined number of secret keys to a first majority key holder and a minority of the predetermined number of secret keys to a first minority key holder, and assigning, for the second multi-signature wallet, a majority of the predetermined number of secret keys to a second majority key holder and a minority of the predetermined number of secret keys to a second minority key holder, wherein the first majority key holder and the second majority key holder are associated with the first user account, and the first minority key holder and the second minority key holder are associated with the second user account;
   facilitating, through the network, initialization of an exchange of assets between the first user account and the second user account via the plurality of multi-signature wallets;
   monitoring, through the network, an occurrence of a contingency event within a contingency expiration period using structured event tracking logic associated with the configuration record; and
   managing, through the network, a transfer of the assets between the first user account and the second user account and a conditional release of one or more secret keys associated with the second multi-signature wallet, the one or more secret keys initially held by the first user account and released to the second user account based on the occurrence or non-occurrence of the contingency event within the contingency expiration period.

2. The computer-implemented method of claim 1, further comprising:
   generating the predetermined number of secret keys for each of the first multi-signature wallet and the second multi-signature wallet involved in a value-exchange transaction.

3. The computer-implemented method of claim 2, further comprising:
   requiring the first user account and the second user account to provide the predetermined number of secret keys to authorize the value-exchange transaction.

4. The computer-implemented method of claim 2, further comprising:
   transferring assets between the first user account and the second user account through the plurality of multi-signature wallets; and
   requiring the first user account and the second user account to provide the predetermined number of secret keys to authorize the value-exchange transaction.

5. The computer-implemented method of claim 1, wherein the majority key holder and the minority key holder are associated with the first user account and the second user account through respective user accounts, and wherein the first user account and the second user account are registered on a platform facilitating the contingent transfer of value system.

6. The computer-implemented method of claim 1, further comprising:
generating a contingency contract to govern terms and conditions of the contingent transfer of value, wherein the contingency contract is configured to automatically execute actions based on the occurrence or non-occurrence of the contingency event within the contingency expiration period.

7. The computer-implemented method of claim 1, further comprising:
tracking each portion of an asset balance in the plurality of multi-signature wallets that contains assets from different contingency events by adding custom records to incoming and outgoing blockchain transactions associated with the contingent transfer of value, wherein the custom records include an expiration date of the contingency expiration period associated with respective different contingency events.

8. The computer-implemented method of claim 1, wherein the contingent transfer of value system facilitates the transfer of virtual currency between the first user account and the second user account by creating separate multi-signature wallets for each transaction, preventing commingling of virtual currency balances from different transactions, and maintaining an external log of currency transactions with each of the multi-signature wallets associated with respective user accounts.

9. The computer-implemented method of claim 1, wherein a multi-signature wallet is created for each contingency event, a number of required secret keys for a transaction involving a respective multi-signature wallet increases as a number of contingency events progresses, and a majority of the number of required secret keys are held by the majority key holder, with remaining secret keys distributed among the minority key holder associated with the first user account and the second user account involved in the transaction.

10. A contingent transfer of value system utilizing multi-signature wallets, comprising:
a computing device processor; and
a memory device including instructions that, when executed by the computing device processor, enables the contingent transfer of value system to:
obtain, via at least an application programming interface, a configuration record configured to facilitate contingent transfers of value between a plurality of multi-signature wallets, the plurality of multi-signature wallets including at least a first multi-signature wallet associated with a first user account and a second multi-signature wallet associated with a second user account, wherein the plurality of multi-signature wallets are configured to communicate over a network, the network combining features of both decentralized and centrally-regulated cryptocurrency systems of user accounts in communication with other commercial banking and finance networks and services,
establish the first multi-signature wallet and the second multi-signature wallet, individual multi-signature wallets being associated with an authorization scheme that requires a predetermined number of secret keys for authorizing transactions involving respective multi-signature wallets,
assign, for the first multi-signature wallet, a majority of the predetermined number of secret keys to a first majority key holder and a minority of the predetermined number of secret keys to a first minority key holder, and assigning, for the second multi-signature wallet, a majority of the predetermined number of secret keys to a second majority key holder and a minority of the predetermined number of secret keys to a second minority key holder, wherein the first majority key holder and the second majority key holder are associated with the first user account, and the first minority key holder and the second minority key holder are associated with the second user account,
facilitate, through the network, initialization of an exchange of assets between the first user account and the second user account via the plurality of multi-signature wallets,
monitor, through the network, an occurrence of a contingency event within a contingency expiration period using structured event tracking logic associated with the configuration record, and
manage, through the network, a transfer of the assets between the first user account and the second user account and a conditional release of one or more secret keys associated with the second multi-signature wallet, the one or more secret keys initially held by the first user account and released to the second user account based on the occurrence or non-occurrence of the contingency event within the contingency expiration period.

11. The contingent transfer of value system of claim 10, wherein the instructions, when executed by the computing device processor, further enables the contingent transfer of value system to:
generate the predetermined number of secret keys for each of the first multi-signature wallet and the second multi-signature wallet involved in a value-exchange transaction.

12. The contingent transfer of value system of claim 11, wherein the instructions, when executed by the computing device processor, further enables the contingent transfer of value system to:
require the first user account and the second user account to provide the predetermined number of secret keys to authorize the value-exchange transaction.

13. The contingent transfer of value system of claim 11, wherein the instructions, when executed by the computing device processor, further enables the contingent transfer of value system to:
transfer assets between the first user account and the second user account through the respective multi-signature wallets, and
require the first user account and the second user account to provide the predetermined number of secret keys to authorize the value-exchange transaction.

14. The contingent transfer of value system of claim 10, wherein the majority key holder and the minority key holder are associated with the first user account and the second user account through respective user accounts, and wherein the first user account and the second user account are registered on a platform facilitating the contingent transfer of value system.

15. The contingent transfer of value system of claim 10, wherein the instructions, when executed by the computing device processor, further enables the contingent transfer of value system to:

generate a contingency contract to govern terms and conditions of the contingent transfer of value, wherein the contingency contract is configured to automatically execute actions based on the occurrence or non-occurrence of the contingency event within the contingency expiration period.

16. The contingent transfer of value system of claim 10, wherein the instructions, when executed by the computing device processor, further enables the contingent transfer of value system to:

track each portion of an asset balance in the plurality of multi-signature wallets that contains assets from different contingency events by adding custom records to incoming and outgoing blockchain transactions associated with the contingent transfer of value, wherein the custom records include an expiration date of the contingency expiration period associated with respective different contingency events.

17. The contingent transfer of value system of claim 10, wherein the contingent transfer of value system facilitates the transfer of virtual currency between the first user account and the second user account by creating separate multi-signature wallets for each transaction, preventing commingling of virtual currency balances from different transactions, and maintaining an external log of currency transactions with each of the multi-signature wallets associated with respective user accounts.

18. The contingent transfer of value system of claim 10, wherein a multi-signature wallet is created for each contingency event, a number of required secret keys for a transaction involving a respective multi-signature wallet increases as a number of contingency events progresses, and a majority of the number of required secret keys are held by a majority key holder, with remaining secret keys distributed among the minority.

19. A non-transitory computer readable storage medium storing instructions that, when executed by at least one processor of a contingent transfer of value system utilizing multi-signature wallets, causes the contingent transfer of value system to:

obtain, via at least an application programming interface, a configuration record configured to facilitate contingent transfers of value between a plurality of multi-signature wallets, the plurality of multi-signature wallets including at least a first multi-signature wallet associated with a first user account and a second multi-signature wallet associated with a second user account, wherein the plurality of multi-signature wallets are configured to communicate over a network, the network combining features of both decentralized and centrally-regulated cryptocurrency systems of user accounts in communication with other commercial banking and finance networks and services;

establish the first multi-signature wallet and the second multi-signature wallet, individual multi-signature wallets being associated with an authorization scheme that requires a predetermined number of secret keys for authorizing transactions involving respective multi-signature wallets;

assign, for the first multi-signature wallet, a majority of the predetermined number of secret keys to a first majority key holder and a minority of the predetermined number of secret keys to a first minority key holder, and assigning, for the second multi-signature wallet, a majority of the predetermined number of secret keys to a second majority key holder and a minority of the predetermined number of secret keys to a second minority key holder, wherein the first majority key holder and the second majority key holder are associated with the first user account, and the first minority key holder and the second minority key holder are associated with the second user account;

facilitate, through the network, initialization of an exchange of assets between the first user account and the second user account via the plurality of multi-signature wallets;

monitor, through the network, an occurrence of a contingency event within a contingency expiration period using structured event tracking logic associated with the configuration record; and manage, through the network, a transfer of the assets between the first user account and the second user account and a conditional release of one or more secret keys associated with the second multi-signature wallet, the one or more secret keys initially held by the first user account and released to the second user account based on the occurrence or non-occurrence of the contingency event within the contingency expiration period.

20. The non-transitory computer readable storage medium of claim 19, wherein the instructions, when executed by the at least one processor, further enables the contingent transfer of value system to:

generate the predetermined number of secret keys for each of the first multi-signature wallet and the second multi-signature wallet involved in a value-exchange transaction;

transfer assets between the first user account and the second user account through the multi-signature wallets; and require the first user account and the second user account to provide the predetermined number of secret keys to authorize the value-exchange transaction.

* * * * *